United States Patent
Fargo et al.

(10) Patent No.: US 11,989,135 B2
(45) Date of Patent: May 21, 2024

(54) PROGRAMMABLE ADDRESS RANGE ENGINE FOR LARGER REGION SIZES

(71) Applicant: Intel Corporation, Santa Clara, CA (US)

(72) Inventors: Farah E. Fargo, Hudson, MA (US); Mitchell Diamond, Shrewsbury, MA (US); David Keppel, Mountain View, CA (US); Samantika S. Sury, Westford, MA (US); Binh Pham, Burlingame, CA (US); Shobha Vissapragada, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 16/786,815

(22) Filed: Feb. 10, 2020

(65) Prior Publication Data
US 2020/0233814 A1    Jul. 23, 2020

(51) Int. Cl.
*G06F 12/10* (2016.01)
*G06F 12/1027* (2016.01)

(52) U.S. Cl.
CPC .... *G06F 12/1027* (2013.01); *G06F 2212/657* (2013.01)

(58) Field of Classification Search
CPC ........... G06F 12/1027; G06F 2212/657; G06F 2212/1024; G06F 2212/154; G06F 2212/163; G06F 2212/652; G06F 2212/681; G06F 2212/683
USPC ........................................................ 711/207
See application file for complete search history.

(56) References Cited

U.S. PATENT DOCUMENTS

| 7,296,139 B1 | 11/2007 | Case et al. |
| 2007/0180215 A1 | 8/2007 | Cascaval et al. |
| 2009/0013149 A1 | 1/2009 | Uhlig et al. |
| 2011/0173411 A1 | 7/2011 | Chen et al. |
| 2013/0111168 A1* | 5/2013 | Circello .................. G06F 9/526 |
| | | 711/E12.098 |
| 2019/0042408 A1* | 2/2019 | Schmisseur ......... G06F 15/7807 |

(Continued)

OTHER PUBLICATIONS

Basu, Arkaprava, et al., "Efficient Virtual Memory for Big Memory Servers", ISCA '13 Proceedings of the 40th Annual International Symposium on Computer Architecture, 2013, 12 pages.

(Continued)

*Primary Examiner* — Hua J Song
(74) *Attorney, Agent, or Firm* — Compass IP Law PC

(57) ABSTRACT

Examples described herein relate to a computing system supporting custom page sized ranges for an application to map contiguous memory regions instead of many smaller sized pages. An application can request a custom range size. An operating system can allocate a contiguous physical memory region to a virtual address range by specifying a custom range sizes that are larger or smaller than the normal general page sizes. Virtual-to-physical address translation can occur using an address range circuitry and translation lookaside buffer in parallel. The address range circuitry can determine if a custom entry is available to use to identify a physical address translation for the virtual address. Physical address translation can be performed by transforming the virtual address in some examples.

15 Claims, 21 Drawing Sheets

(56) References Cited

U.S. PATENT DOCUMENTS

| | | | |
|---|---|---|---|
| 2019/0272226 A1 | 9/2019 | Gooding et al. | |
| 2019/0332296 A1* | 10/2019 | Liu | G06F 3/0631 |
| 2021/0097002 A1* | 4/2021 | Aguren | G06F 12/1009 |

OTHER PUBLICATIONS

Gandhi, Jayneel, et al., "Agile Paging For Efficient Memory Virtualization", IEEE Microarchitecture (MICRO), 2017, 7 pages.

Gandhi, Jayneel, et al., "Range Translations for Fast Virtual Memory", IEEE Microarchitecture (MICRO), 2016, 9 pages.

International Search Report and Written Opinion for PCT Patent Application No. PCT/US20/66484, dated Mar. 30, 2021, 10 pages.

Juan Navarro et al., 'Practical, transparent operating system support for superpage', Publication: ACM SIGOPS Operating Systems Review, DOI: 10.1145/844128.844138, pp. 1-16, Dec. 2002 [retrieved on Mar. 12, 2020]. Retrieved from http://dl.acm.org/doi/10.1145/844128.844138, pp. 1-5, 16 pages.

Krishnakumar, R., "HugeTBL—Large Page Support in the Linux Kernel", Linux Gazette, https://linuxgazette.het/155/krishnakumar.html, Oct. 2008, 6 pages.

Chang Hyun Park et al.: "Efficient synonym filtering and scalable delayed translation for hybrid virtual caching", ACM Sigarch Computer Architecture News, ACM Special Interest Group On Computer Architecture, 2 Penn Plaza, Suite 701 New York NY 10121-0701 USA, vol. 44, No. 3, Jun. 18, 2016, pp. 217-229, 13 pages.

Karakostas Vasileios et al.: "Redundant Memory Mappings for fast access to large memories", 2015 ACM/IEEE 42nd Annual International Symposium On Computer Architecture (ISCA), IEEE, Jun. 13, 2015, pp. 66-78, 13 pages.

Partial European Search Report for Patent Application No. 20919165.9, Mailed Feb. 7, 2024, 15 pages.

* cited by examiner

PROGRAMMABLE ADDRESS RANGE ENGINE FOR LARGER REGION SIZES

Modern processors use page tables for address translation (e.g., Translation Lookaside Buffers (TLBs)) to cache virtual to-physical page mappings. With the growing access to increasing large memory sizes, coupled with the lack of locality in modern workloads, current TLB architectures may not provide sufficient memory mapping resources for expected performance requirements. To combat this growing access pattern, virtual memory designs are increasing their TLB cache sizes to map address translations of larger memory regions. Current methods of growing the TLB cache to be able to map more physical memory addresses are helpful. But with the large workload sizes and their random data access patterns (as in AI workloads), adding more cache becomes a losing battle due to the area/performance and power efficiency challenges.

DETAILED DESCRIPTION

Figure 1:
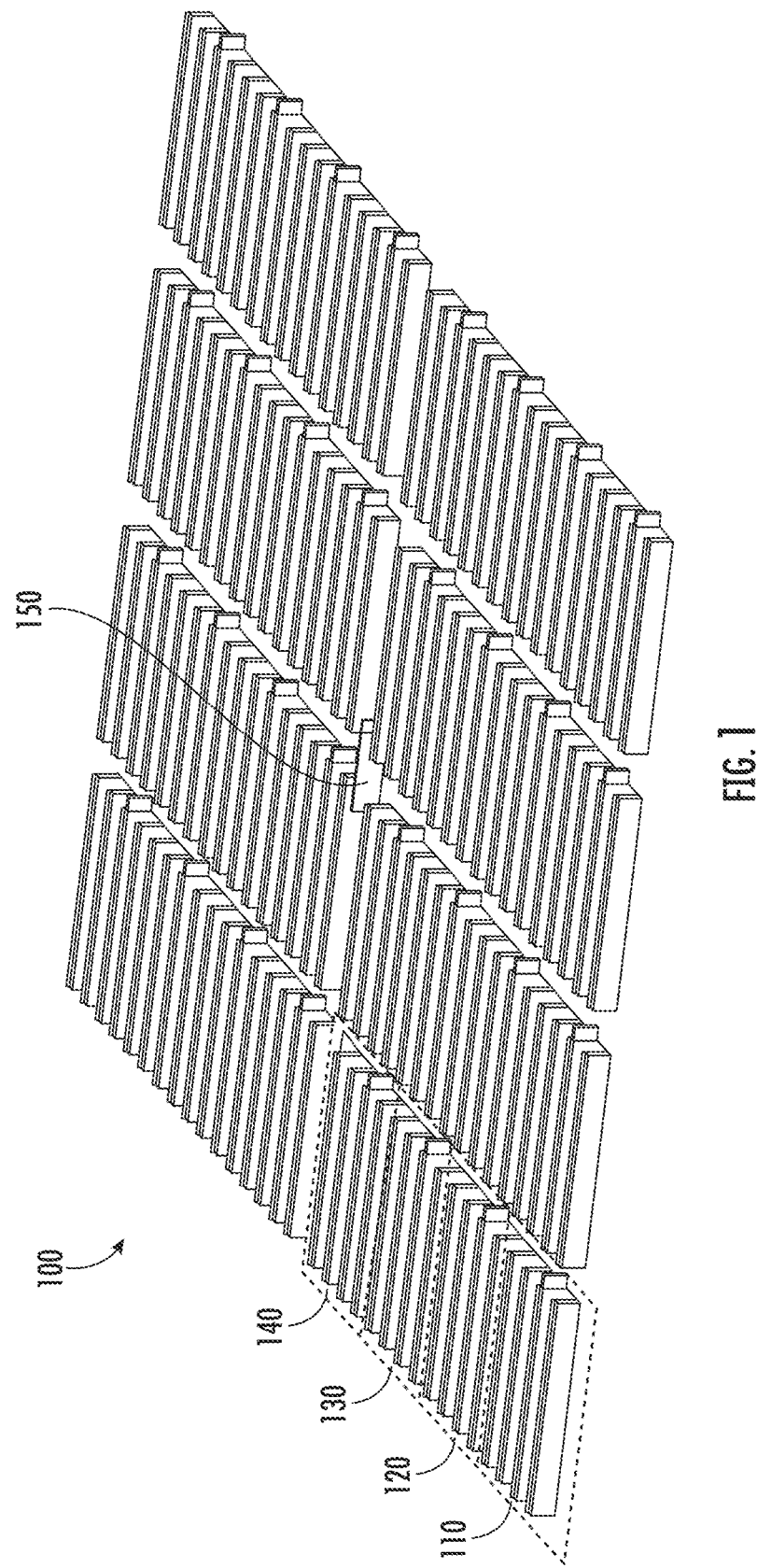
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniB and or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
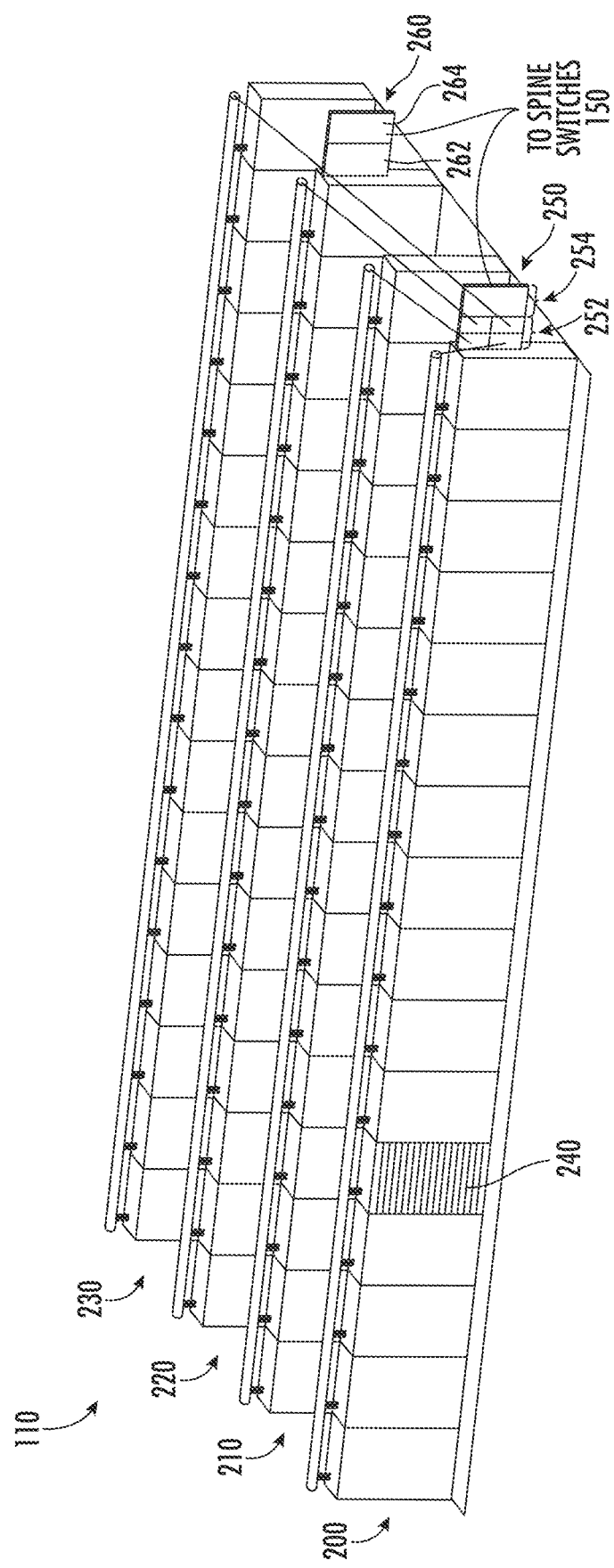
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
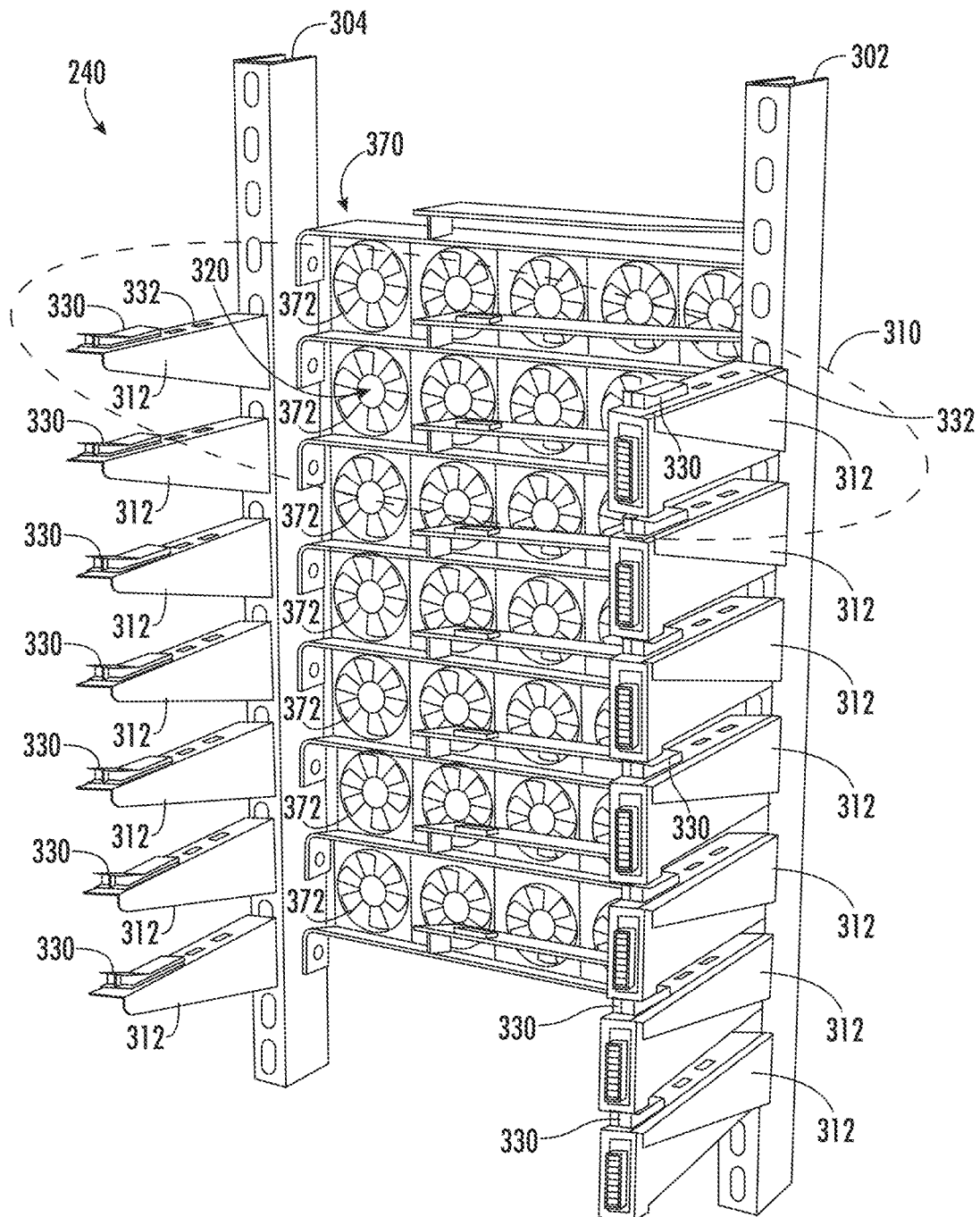
FIG. 3 is a perspective view of at least one embodiment of a rack that may be included in a pod.
Figure 4:
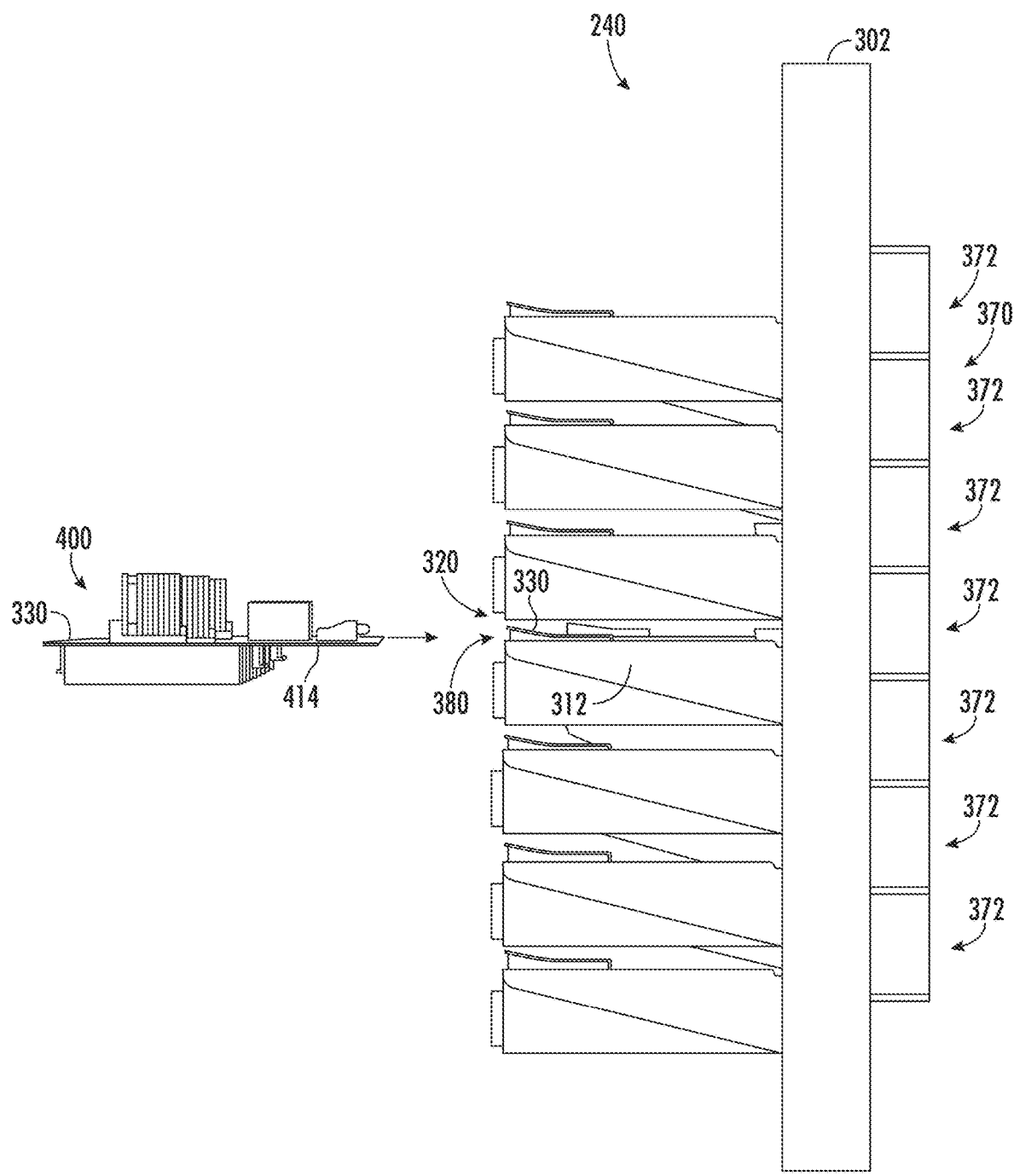
FIG. 4 is a side elevation view of a rack.
Figure 5:
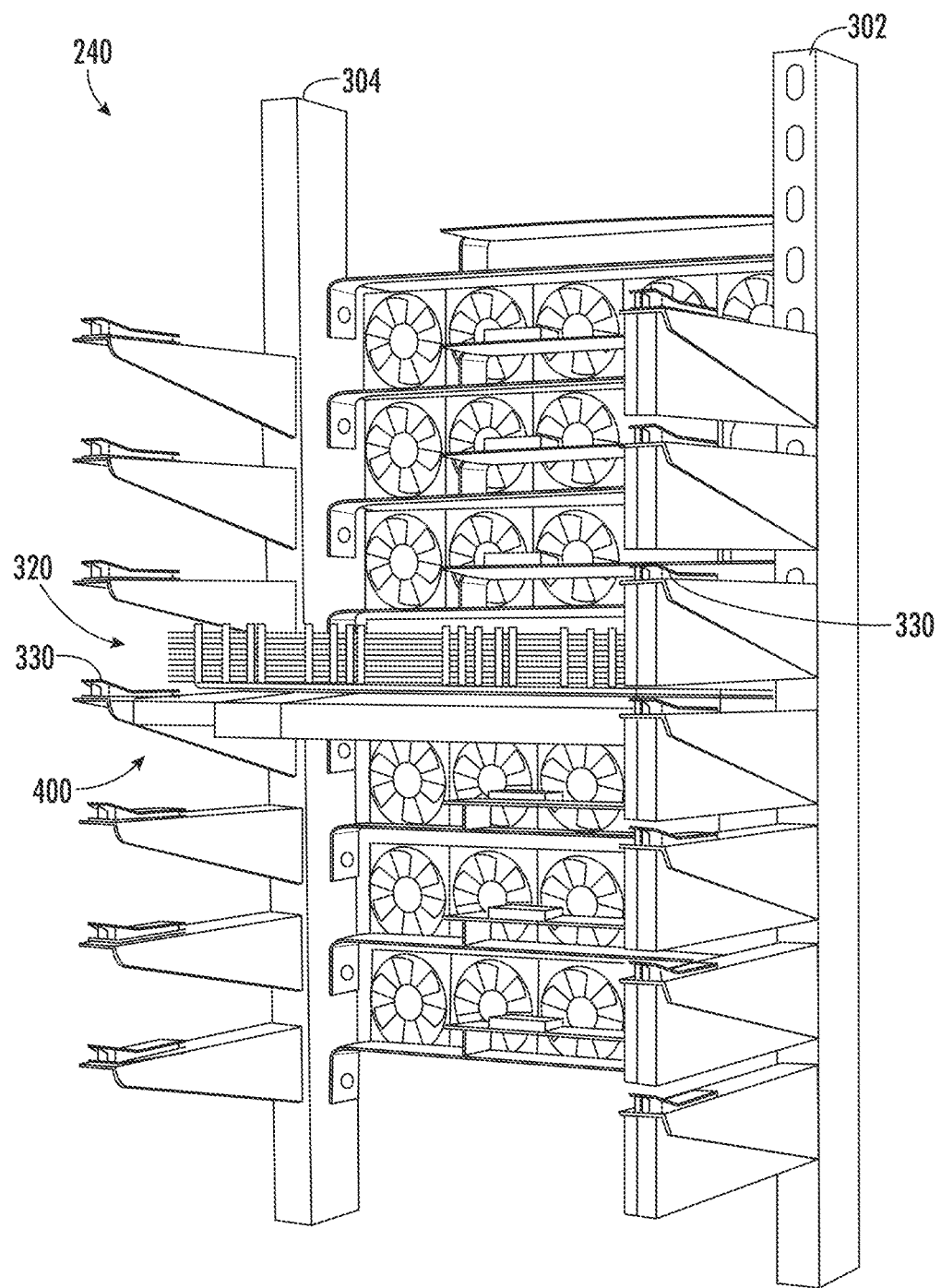
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
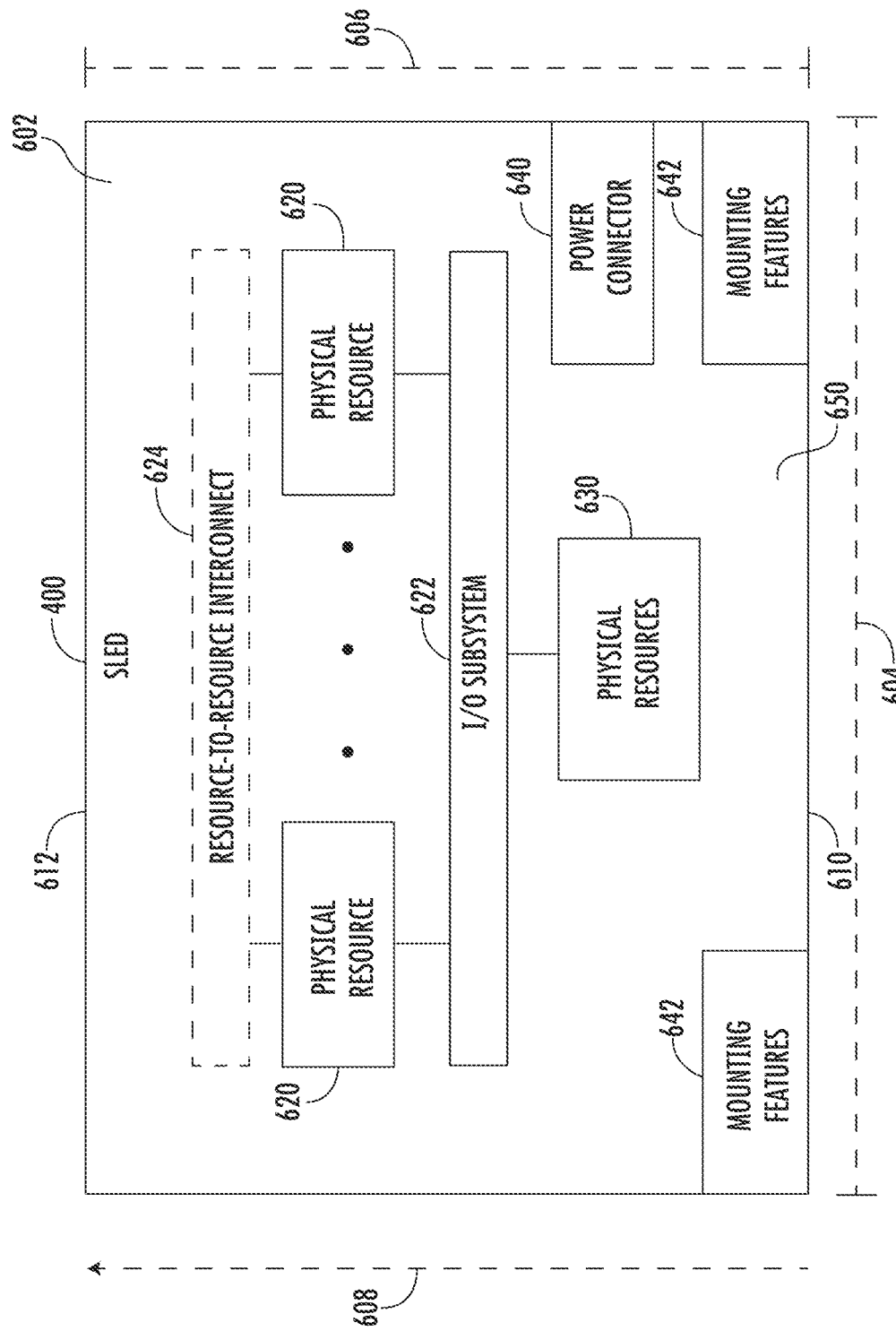
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
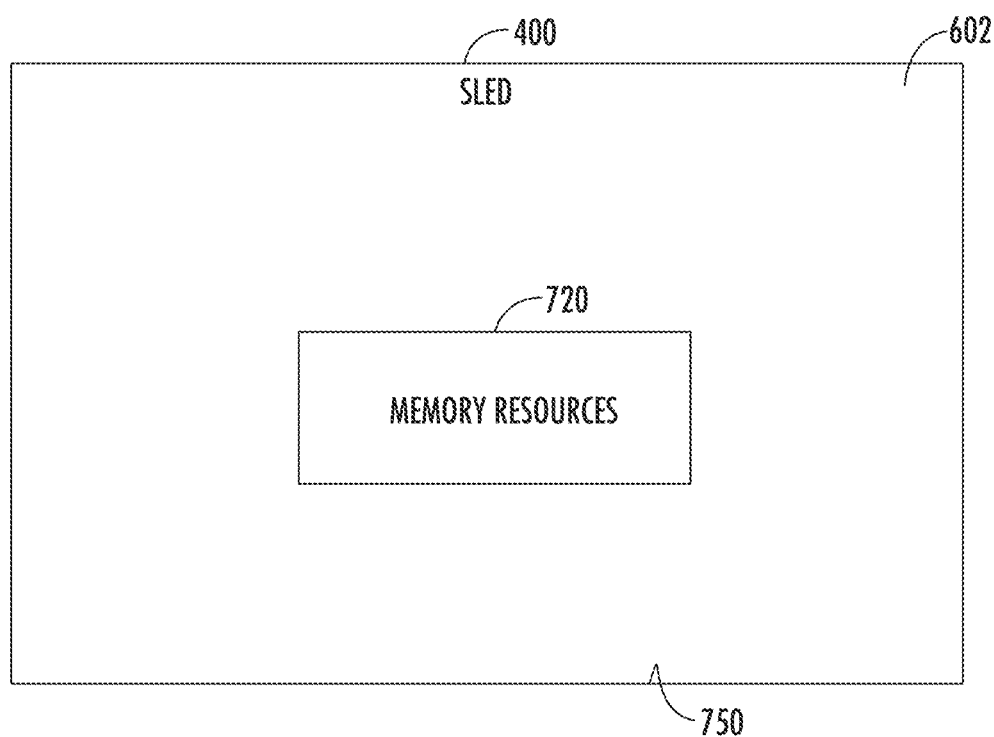
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
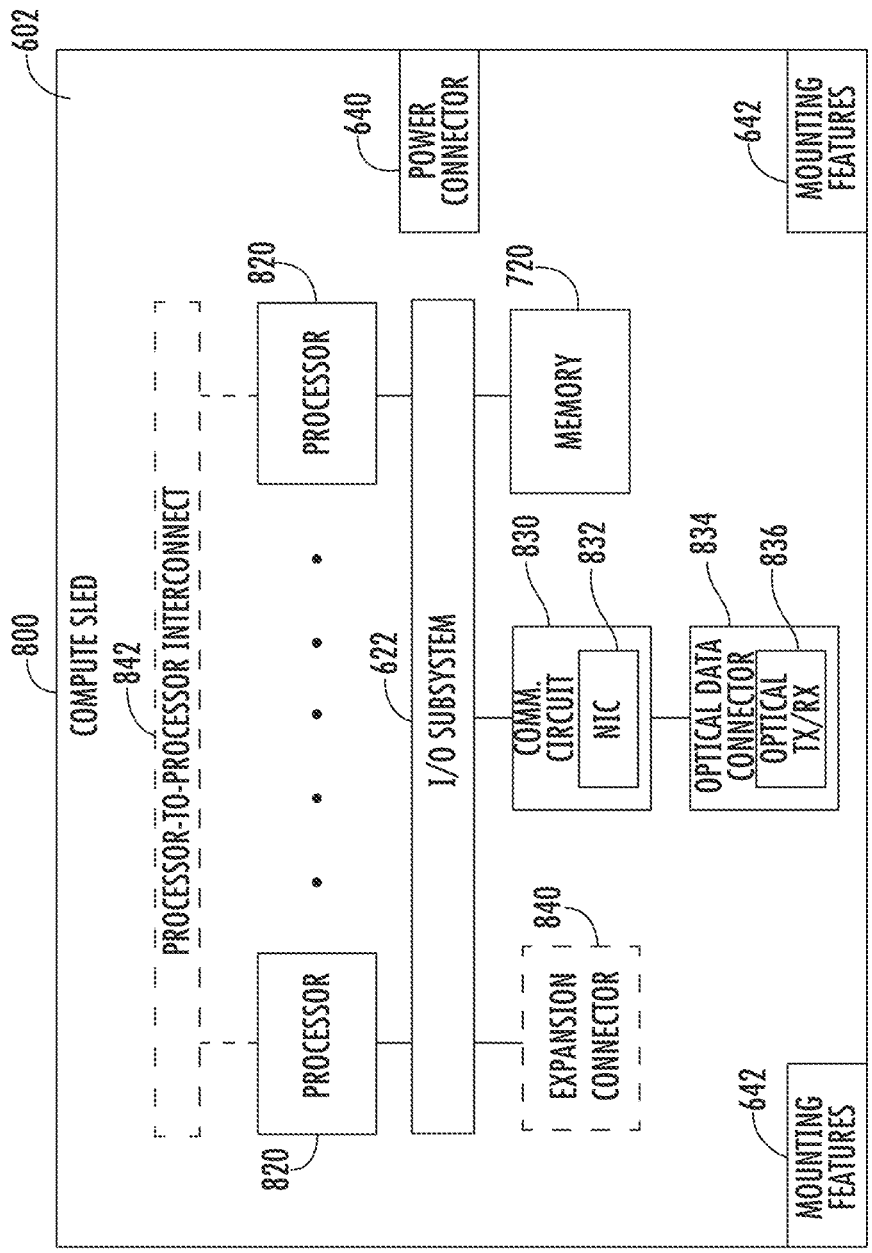
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally, or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
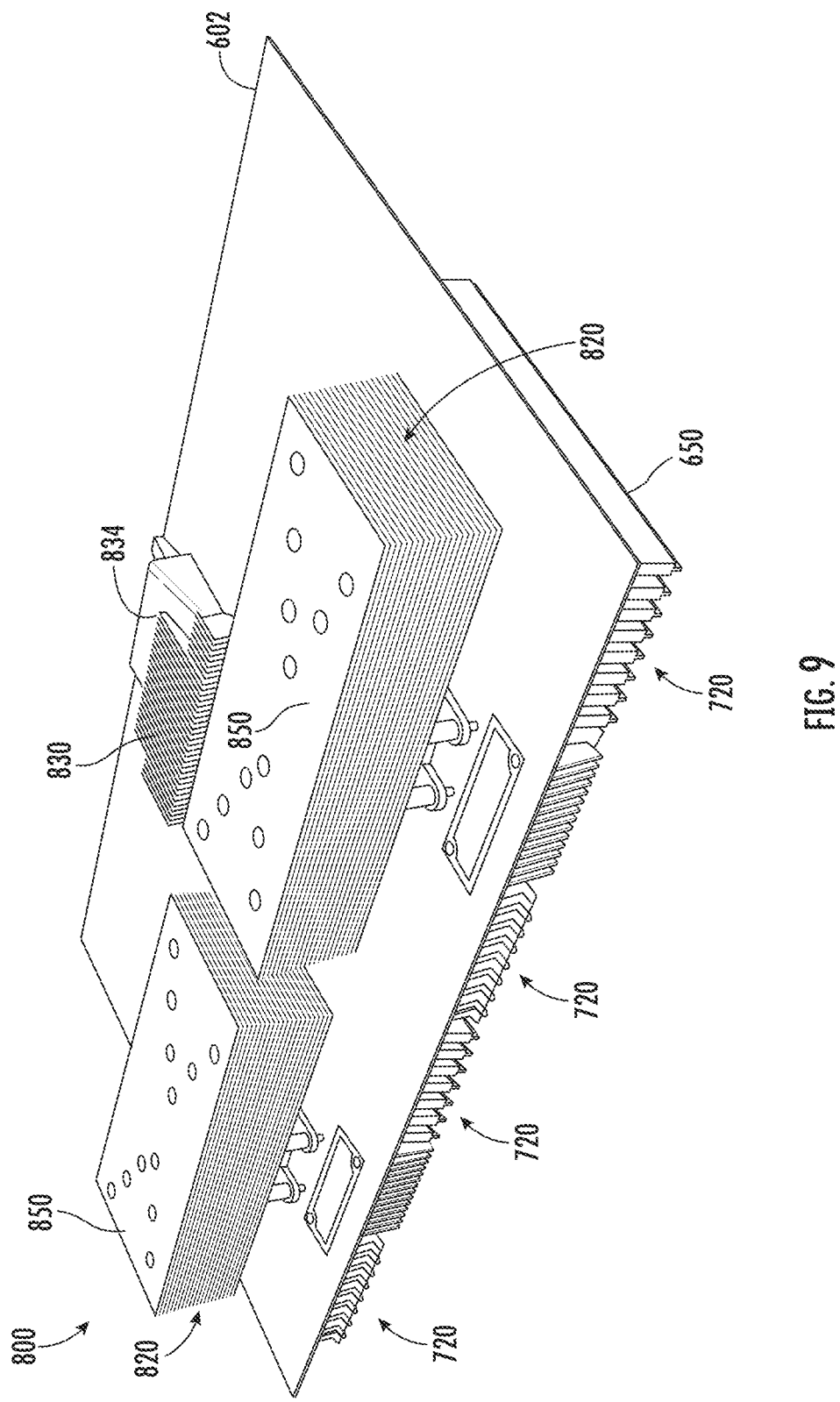
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
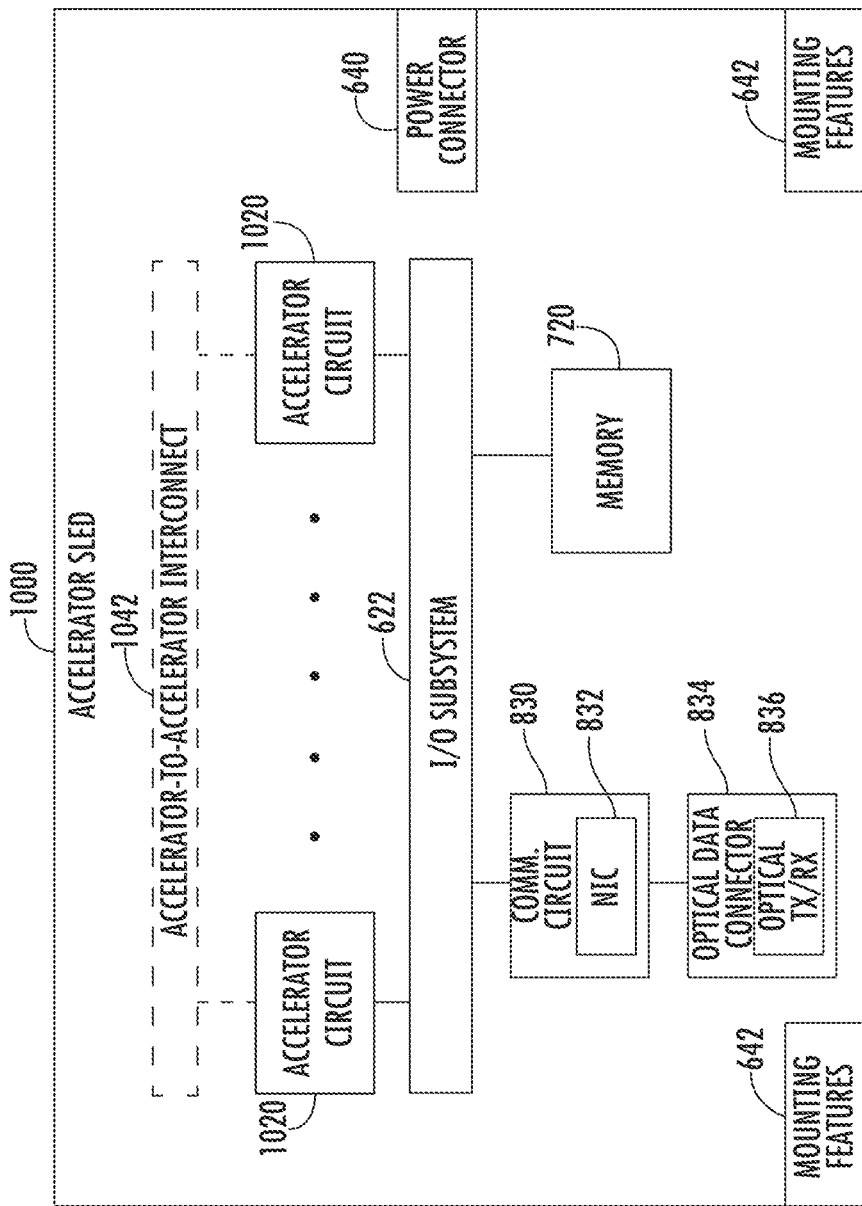
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
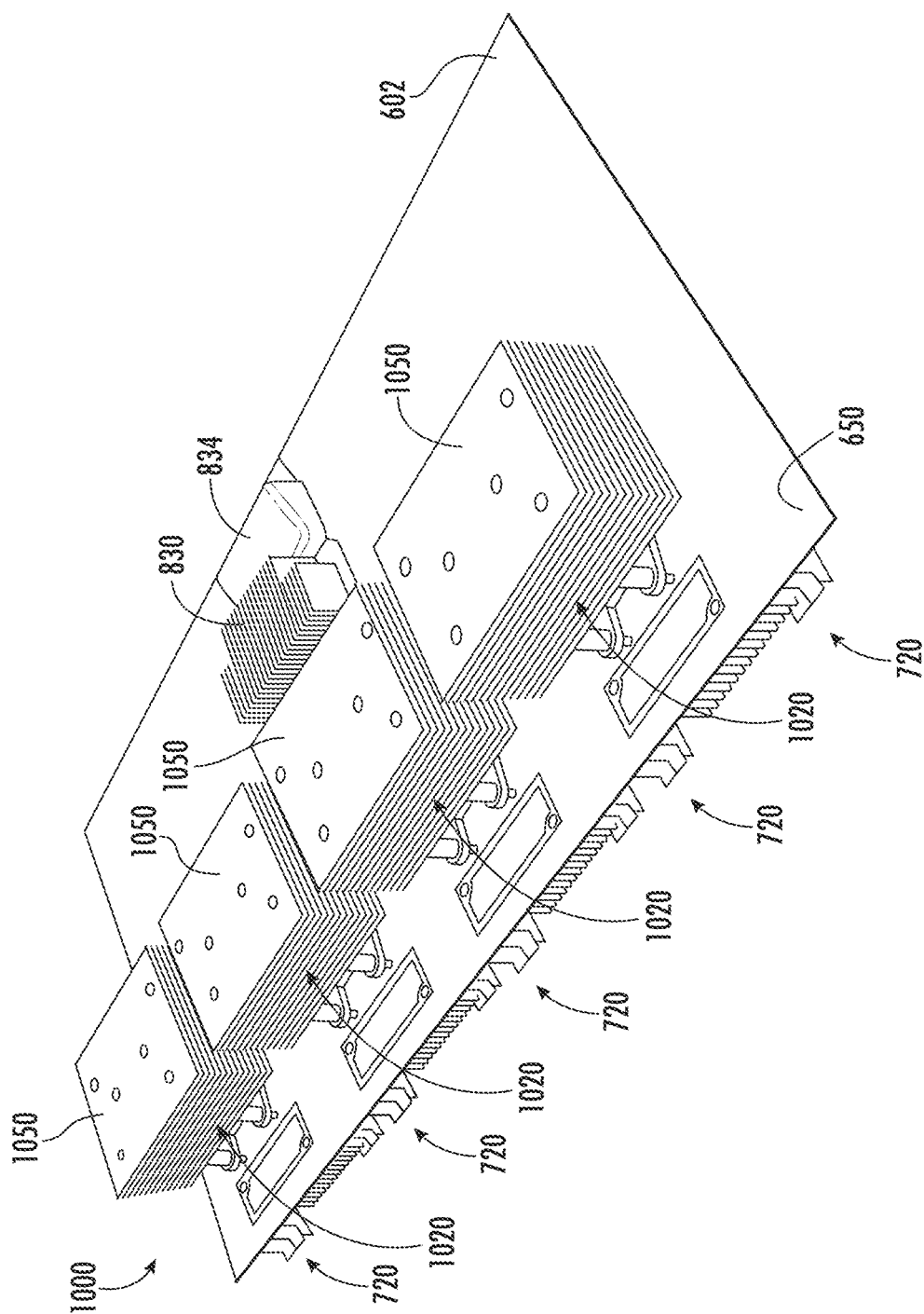
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
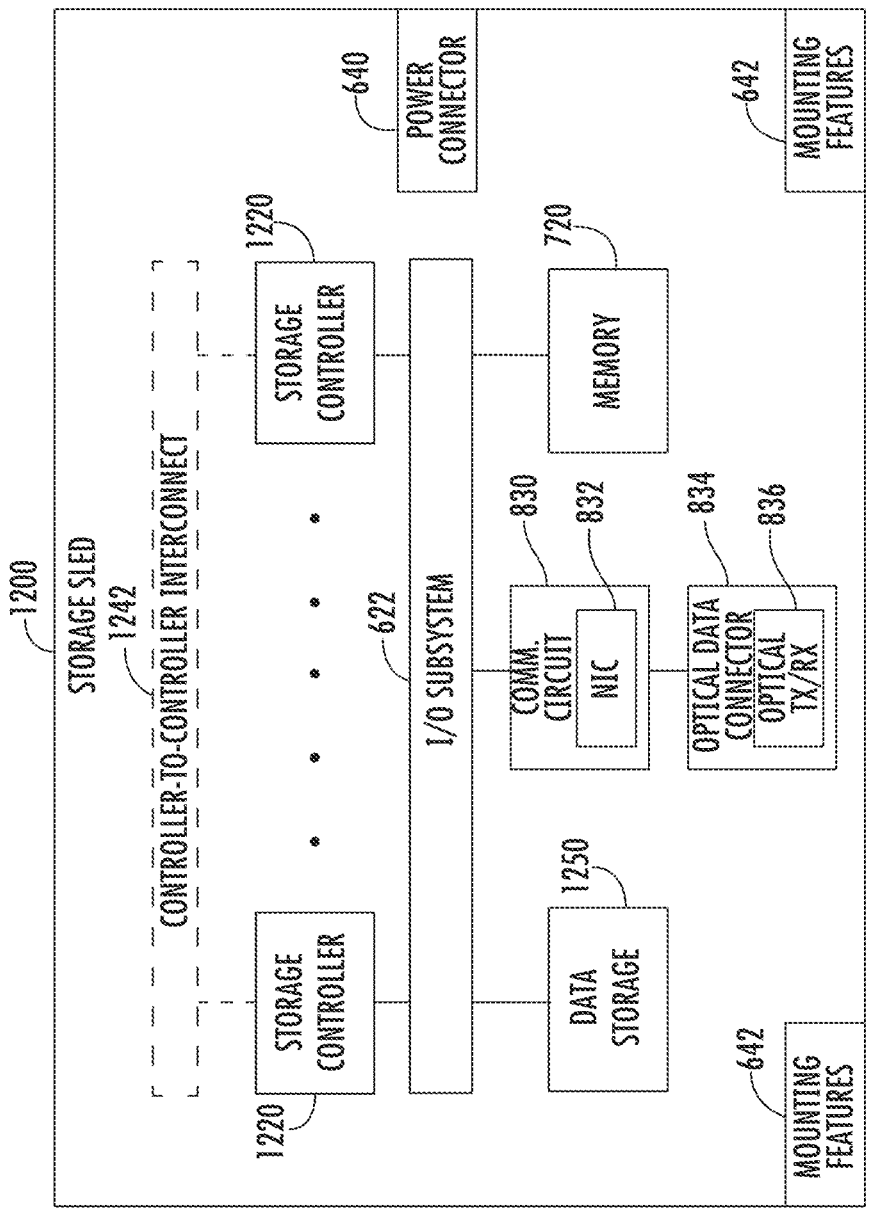
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
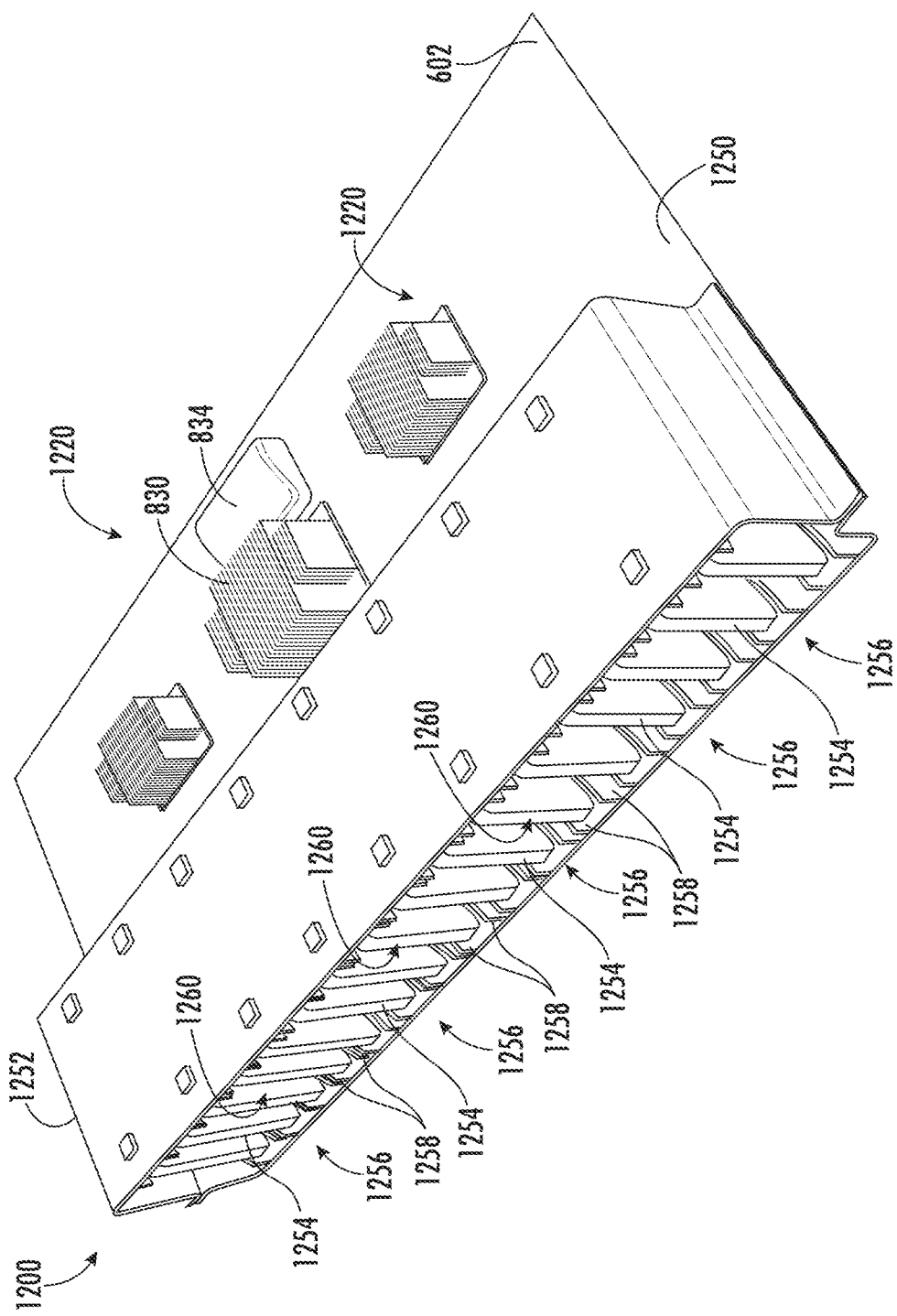
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
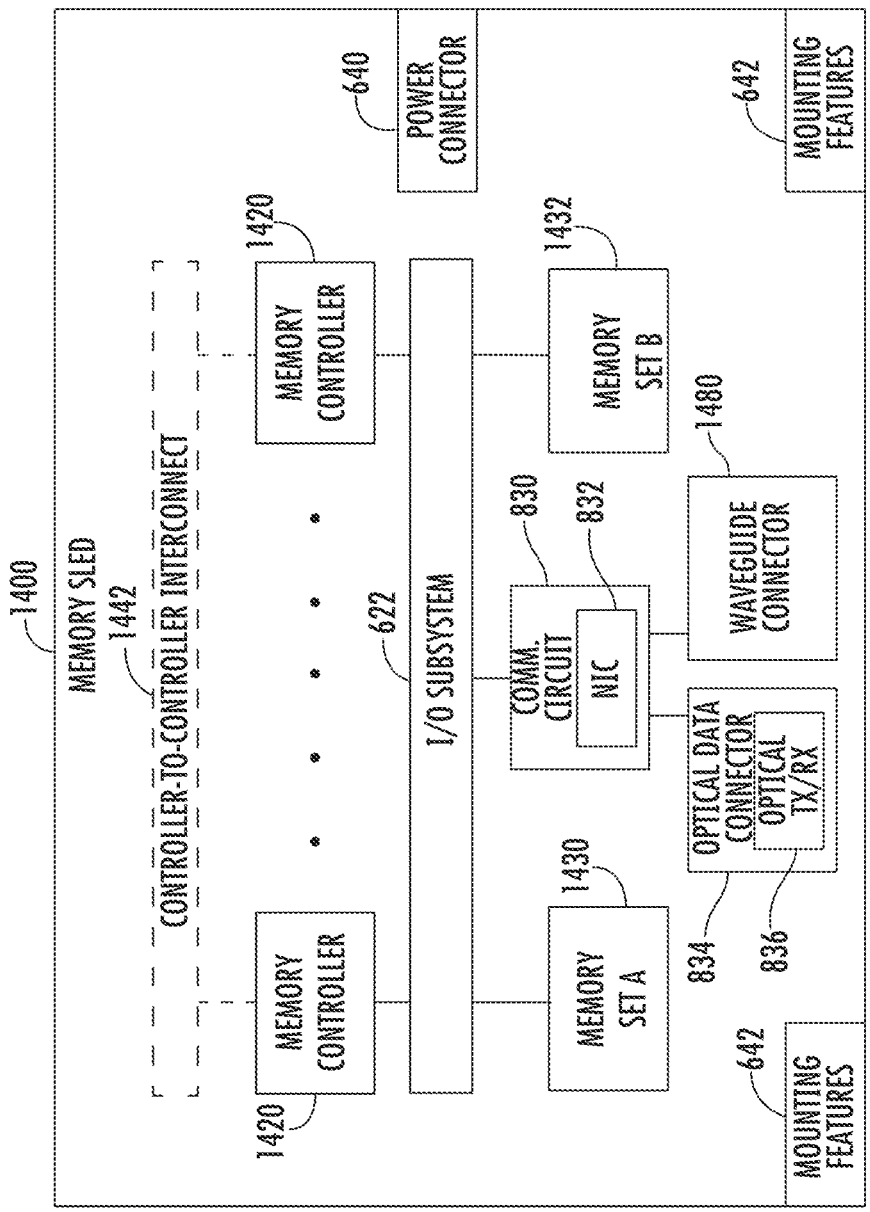
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
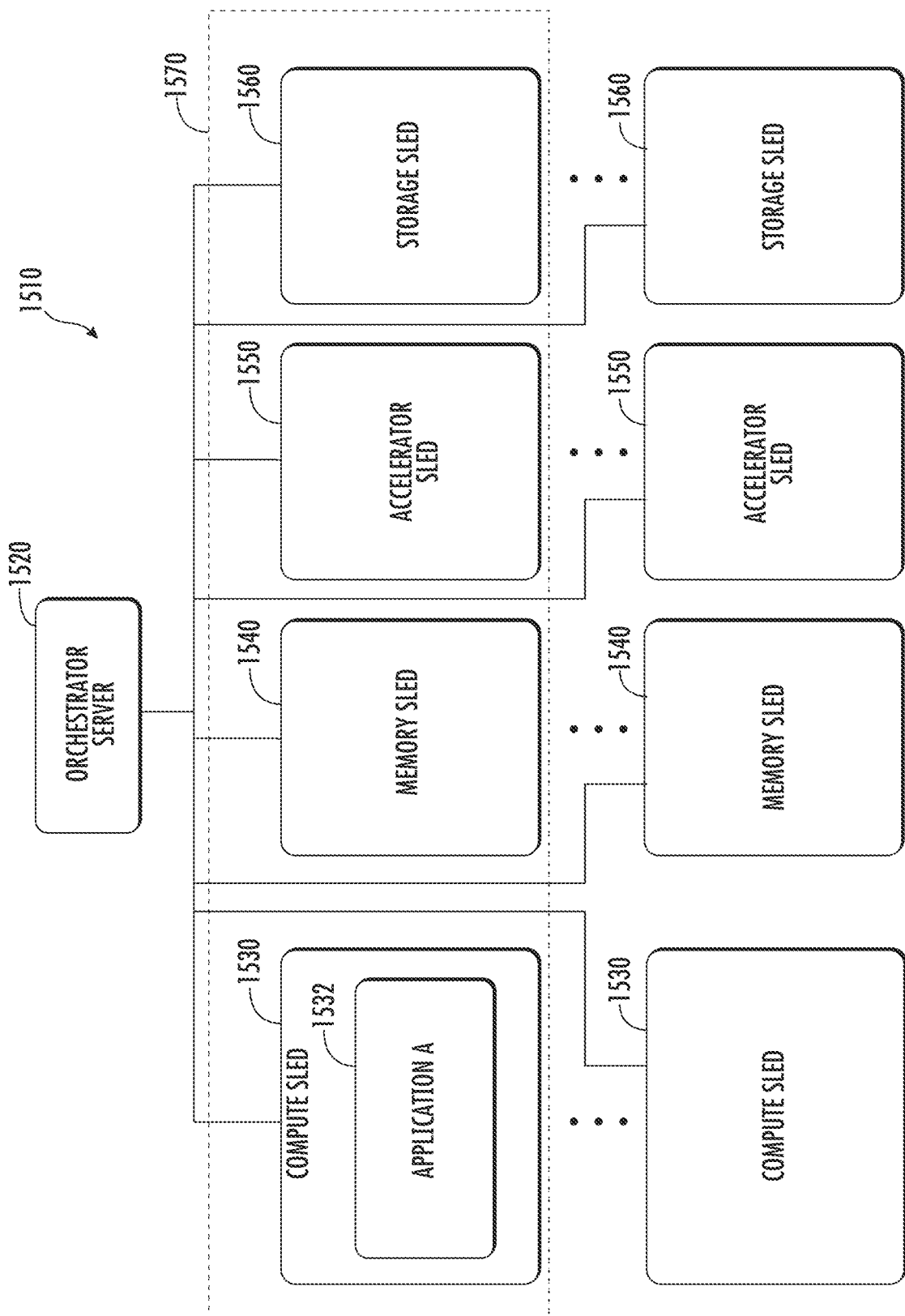
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Address Range Engine

From a memory management perspective, the entire physical memory is divided into frames and the virtual memory is divided into pages. For example, a page can be 4096 bytes. A memory management unit performs a translation of virtual memory address to physical memory address in memory (e.g., a random access memory or persistent memory). Information regarding which virtual memory page maps to which physical frame is kept in a data structure called a page table. A fast lookup cache can be a buffer. In some examples, the buffer can be a TLB contains certain virtual memory address to physical memory address mappings. A TLB can be accessed to translate a virtual memory address to a physical memory address. If a valid address translation is not present in the TLB, a TLB miss occurs. If a TLB miss occurs, the memory management unit will have to refer to the page tables to obtain the virtual to physical address translation. A TLB miss introduces latency from having to consult a TLB first and then a page table.

Some current CPU architectures support bigger page sizes so that CPU and operating system (OS) have less entries to look-up. For example, a larger page can be 2 MB or 4 MB or other sizes. For Linux, bigger page sizes are named Huge Pages. For BSD, bigger page sizes are called Super Pages. For Windows, bigger page sizes are called Large Pages. For example, the HugeTLB feature in the Linux® kernel allows applications to use bigger page sizes. Large pages have a larger coverage or span such that a single TLB entry can span a larger memory area. By using large pages, the TLB misses can be reduced. Applications with high memory access demands such as database applications, high performance computing (HPC) applications can potentially benefit from large pages.

Some solutions can improve the overall performance for page translations by increasing page sizes and TLB sizes along with adjusting page walkers to reduce the overall virtual to physical address translation time. Some solutions can adjust the use of entries within the TLBs by utilizing the entries in a more efficient manner.

Figure 16:
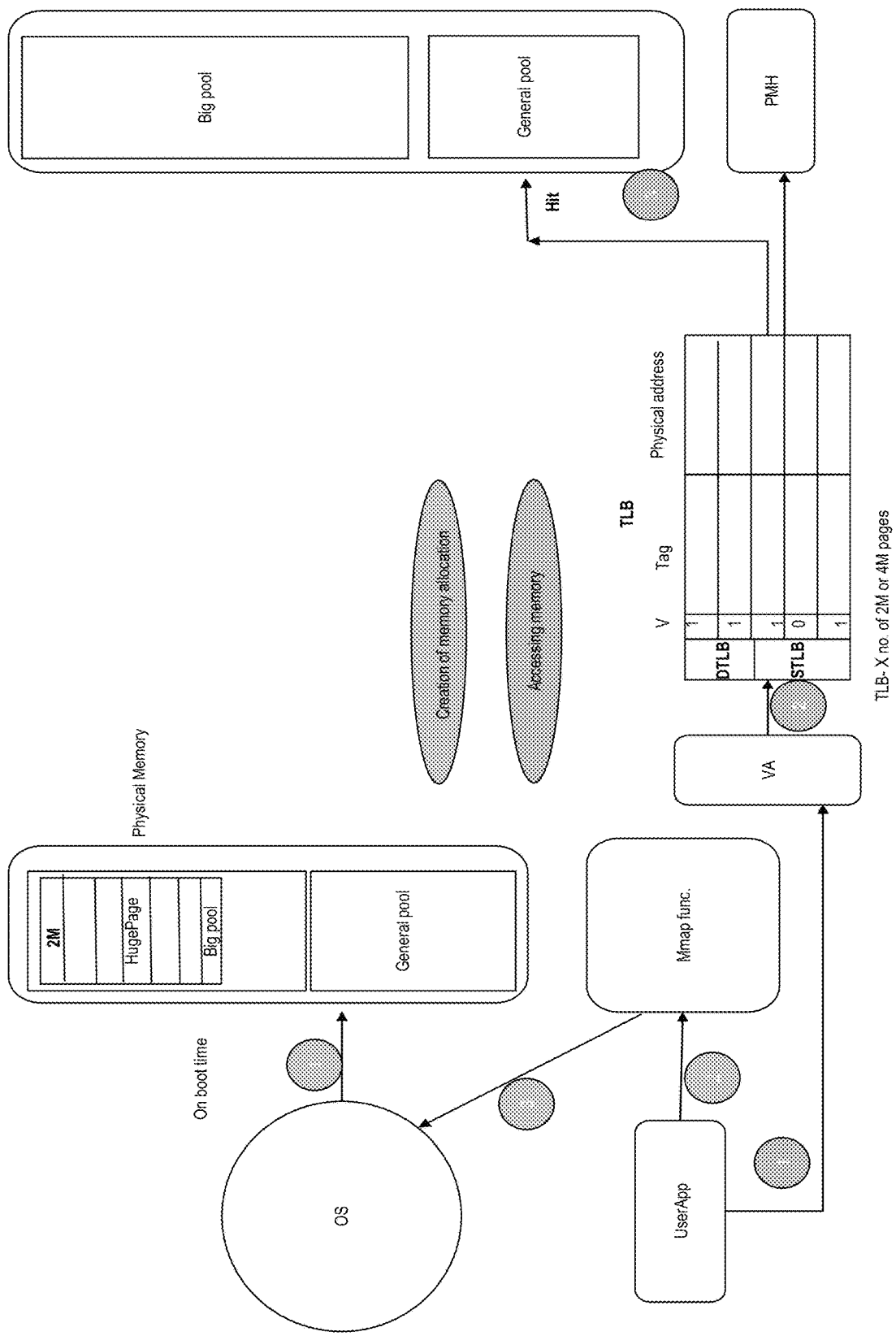
FIG. 16 shows an example of allocation of a big pool and use of Huge Pages virtual to physical address translation in a translation lookaside buffer.

FIG. 16 shows an example of allocation of a big pool and use of Huge Pages virtual to physical address translation in a TLB. In this example, a big pool size is 1 TB within physical memory. When a Huge Page delineation is used, 500,000 2 MB-sized TLB entries are used to translate virtual addresses to physical addresses in the big pool. The OS maps the memory region using as few entries as possible to not have to fragment the memory region into many small pages. However, this large number of entries can result in many TLB misses for certain access patterns such as locality of reference, whereby an application can access some subset of memory in quick succession, GUPS workload, or random memory access (e.g., cross page patterns).

As physical memory sizes grow, the size of TLB caches may grow in order to store more translation entries. However, increasing the size of a TLB can be infeasible given cost and physical area restrictions, which can limit the benefit of use of a TLB. As HPC and datacenters use more memory and need to access this memory in a nonlinear method, some designs are struggling to cache the mapping for these memory access patterns as there can be insufficient cache space. Spilling over the mapping capabilities of the current TLB designs to overflow causing page walks to replenish the TLB caches which introduces performance penalties to replenish the cache.

Various embodiments allow a computing system to support custom page sized ranges for an application or OS/driver to map contiguous memory regions instead of many smaller sized pages. An application or device can request a custom range size, such as large arrays. An operating system can allocate a contiguous physical memory region to a virtual address range by specifying a custom range sizes that are larger or smaller than the normal general page sizes that a processor provides. For example, a PTE in the address range engine can correspond to a page of 8 MB, 16 MB, or other sizes, and increase in size to and beyond 1 GB. Custom ranges can allow applications to utilize larger memory sizes and nonlinear access patterns and still be able to keep the performance of the application while reducing TLB misses. Various embodiments allow the computing system to cache a large memory region without increasing a number of entries stored in a TLB cache.

For an application to access a region of memory (e.g., read or write) by specifying a virtual address, various embodiments provide use of an address range engine and TLB. An address range engine can include various custom ranges of virtual-to-physical memory translations of potentially the same or different memory region sizes. Page table entries (PTE) in the address range engine can be configured to allocate variable size regions or fixed page sizes. The address range engine can provide address translation for custom address ranges, where the custom ranges can be of size and alignment which are more general/flexible than page size and alignment. The address range engine can support any sized allocations of a contiguous memory region within a big pool.

A custom range can be a contiguous physical address memory region with aligned pages (e.g., the low N bits of the address are all zero). An address range engine can map potentially sections of continuous or non-continuous physical memory addresses within a region of memory. In some examples, the region of memory can be a big pool. A big pool can be an area of memory that only supports range translations. The global pool can be an area of memory that support non range mappings. When an OS is first starting (before any applications run), it reserves some OS-only memory and then the rest is assigned to a general pool. The OS and device drivers may then create "special" pools and re-assign some memory from the general pool to the special pools. Special pools may be thought of as reservations as there is not yet an application which is using the memory, but it is no longer available for general use. Special pools can have extra guarantees, but also have extra restrictions. One typical restriction is the general pool can take advantage of demand-paged virtual memory (aka "swap") but special pools are typically not able to use swap. Another typical restriction is that it is hard to move memory between pools—one pool may run out of memory while other pools have lots of free memory, but it may be hard to move memory from a pool that has free memory to a pool that is exhausted. Special pools are also used commonly by devices such as GPUs, network interface cards (NICs), and so on. For example, a GPU or NIC may reserve some memory which it can then allocate for buffering between the hardware device and an application which uses the device. Linux offers a big pool allocator, called "HugeTLBfs".

Various embodiments can extend the notion of big pools (e.g., HugeTLBfs or the MSWindows equivalent) to support more flexible use whereby a large allocation can have finer-grained alignment. For example, in conventional paging, a 17.2 GiB alignment both (a) uses 18 page table/TLB entries, and (b) wastes 0.8 GiB of memory. According to various embodiments, a single range entry could be used (instead of 18× entries), and the alignment restrictions can be much less. For example, with 0.25 GiB alignment, a 17.2 GiB request needs to use 17.25 of allocated memory, wasting just 0.05 GiB instead of 0.80 Gib.

The address range engine by an OS can be accessed using a processor executed driver. The address range engine can be managed either by an OS or by treating the range engine as a device and hence a device driver. A driver can configure the address range engine to map custom ranges of virtual memory addresses to memory regions in accordance with embodiments described herein.

Figure 17:
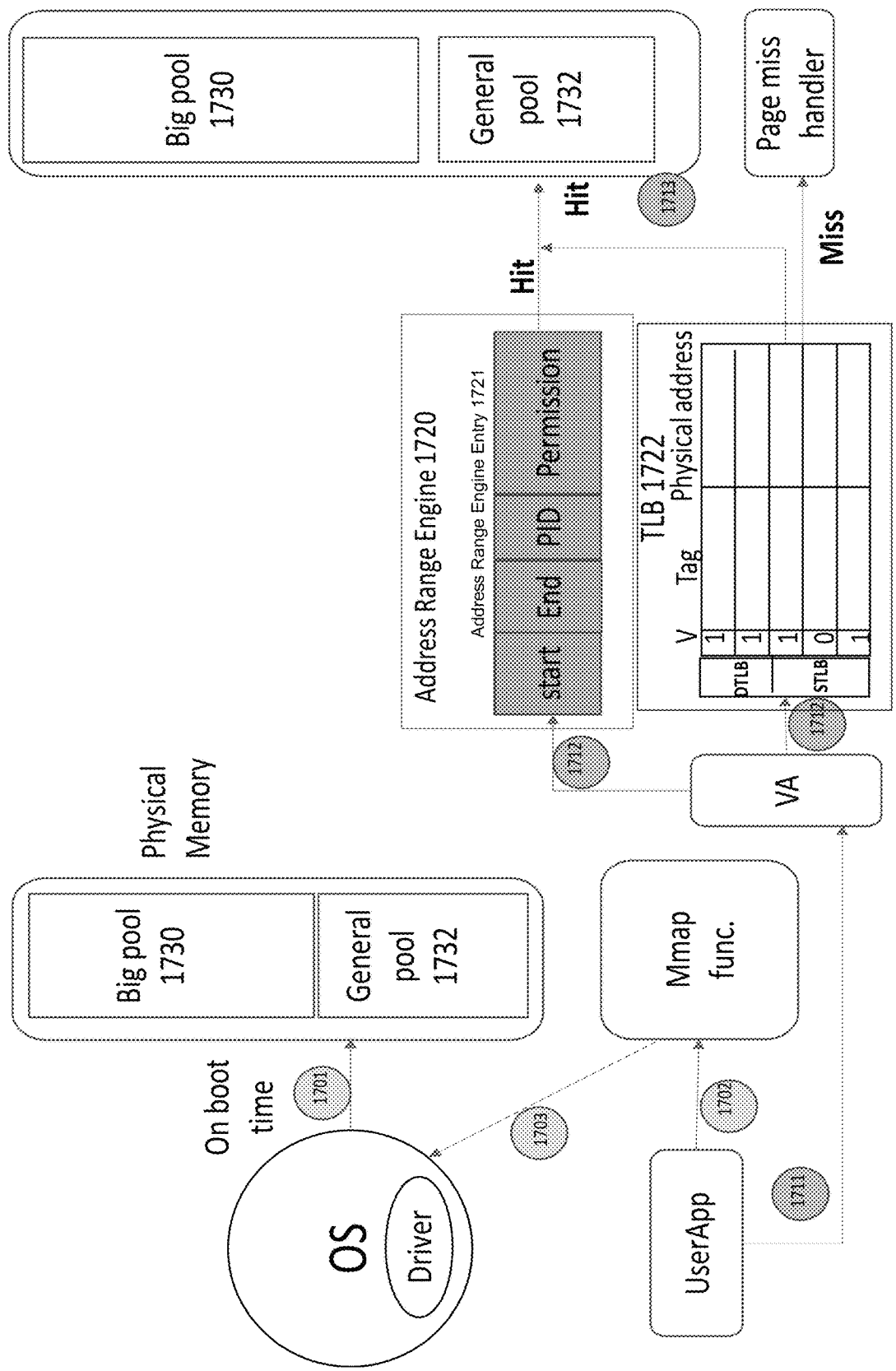
FIG. 17 depicts a system that uses an address range engine and a translation lookaside buffer to provide a translation of a virtual address.

FIG. 17 depicts a system that uses an address range engine and a translation lookaside buffer (TLB) to provide a translation of a virtual address. In some examples, address range engine 1720 can be provided as part of an integrated circuit or device with TLB 1722, inside a core or processor, or part of a memory management unit. A memory management unit (MMU) can perform virtual memory management, memory protection, cache control, or bus arbitration.

An overview of a setup operation to initialize the address range engine 1720 and TLB 1722 is described next. A driver asks the OS for pinned physical memory so it can manage this pool of memory. At 1701, an OS creates a free memory pool "big pool 1730" which will be used for allocation requests that use range mappings, and a free memory pool "general pool 1732" which is used by the operating system to satisfy general memory allocation requests. The driver, through the OS, can create at least the big pool 1730 and general pool 1732 in memory at boot up of a core or processor. The driver can allocate one or more custom ranges in big pool 1730 and the OS allocates general pages in general pool 1732. In some examples, the OS allocates X86 pages. By contrast, a page can be a region which is 2N-size and 2N-aligned. In some examples, physical addresses corresponding to custom ranges are locked in big pool 1730. The OS can allocate a general purpose pool of memory and one or more special pools of memory. The OS, in some examples can be Linux, Windows, FreeBSD, Android, MacOS, iOS, or any other operating system. The OS and driver can execute on a CPU sold or designed by Intel®, ARM®, AMD®, Qualcomm®, IBM®, Texas Instruments®, among others.

In some examples, memory thin provisioning or thin memory provisioning can be used for pools in the memory.

Memory thin provisioning is a manner capable of saving storage or memory resources. As the cost of memory is expensive, saving memory can be beneficial. Under memory thin provisioning, physical storage resources initially allocated to application programs are less than virtual storage resources allocated to application programs or other software. Under provisioning or thin provisioning can be a memory allocation allocated to a processor (e.g., an executed a virtual execution environment or executed application) being greater than an actual amount of physical addressable memory allocated among the memory and/or the memory pool to the processor.

In some examples, memory can be local to a CPU or distributed and scaled out across a fabric such that one or more memory pools are accessible through a fabric or a network. For example, data can be retrieved or stored to virtualized storage nodes using a protocol such as NVMe over Fabrics (NVMe-oF) or NVMe. In some examples, when a CPU is positioned within a rack, the rack can have an overflow memory and systems in that rack have priority for overflow into the overflow memory. A pool can be allocated in such overflow memory.

In some examples, tunneling can be used whereby a memory transaction is sent to a local interface (e.g., bus interface or interconnect) and the local interface packetizes the memory transaction and sends the memory transaction to a remote memory device over another bus or connection.

In some examples, a memory page size can be assigned per application or per virtual machine or virtual execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

At 1702, a UserApp requests use of memory in the big pool. The UserApp can specify whether it needs a memory range allocated from the big pool or from the general pool. If the UserApp requests a memory mapping transaction that specifies a custom range of memory, the memory mapping is allocated from the big pool. The UserApp can specify a custom range size for an entry in an address range engine 1720 where the custom range size is a range of virtual addresses that map to a physical address range. The UserApp can be any application or device (e.g., accelerator).

A custom range can be any sized addressable physical memory region (e.g., large or very large (much larger than 1 GB)). Custom ranges can be used to map a single range of contiguous virtual memory to contiguous physical memory. When a custom range has a large region size, it will free some page table entries from use in either address range engine 1720 or TLB 1722. When a custom range is used, it reduces the number of page mappings which compete for space in the TLB, which tends to improve the TLB hit rate. The larger the fraction of allocated memory which can be mapped using custom ranges, the smaller the number of entries competing for space in the TLB. Page table entries may not be deleted but retained so that any device can access the memory without being required to use ranges. For example, a device which does not have a range engine, or another thread of the application which is using the ranges to map some different memory and wants to use pages to access the memory. However, even though the page table entries are retained, a core or other device or software which uses the address range circuit to map some memory will avoid using the page table entries. That is, a page table entry is filled to the TLB only if there is no range mapping for the memory. For some operating system services which temporarily disable range mappings, even when they are driver-managed, an application may continue to run by using page mappings. At a later time, the range mappings can be re-enabled.

Enablement and management of the custom ranges can be performed by exposing these ranges directly to software to be used in conjunction with pages or through the use of a software-based device driver that enables and manages custom ranges. The device driver can be responsible to allocate the custom range to contiguous physical address range in the big pool 1730.

At 1703, an OS and/or driver allocate a region from the big pool. Allocating a region can include mapping a length of bytes starting at an offset from an address start. When the OS is Linux, an mmap( ) function can be used to allocate a region for use in the big pool. For the big pool, a driver acts as a custom range manager and allocates a memory region based on the memory mapping allocation as requested by the UserApp from the big pool.

Device driver can manage the custom ranges requests by pinning the custom range in physical memory. Note that at run time, after boot, UserApp can request a custom range but there is a risk of not being allocated requested memory range or the range is not contiguous.

The OS and/or driver maps a virtual address (VA) to the Address Range Engine and creates a custom range entry associating the VA to the range entry of physical addresses in the big pool. The driver can calculate information for the address range engine (VADDR start address-VADDR end address, PADDR translation) and maps the requested virtual address range into the Address Range Engine 1720 and creates the custom range entry (shown as address range engine entry 1721). In some examples, the driver saves the address range engine entry 1721 to processor context for use by XSAVE/XRSTOR. A context switch can save or restore configuration of Address Range Engine 1720. The driver can manage and assign the custom region to the address range engine 1720 using features of x86 paging such as memory mapping updates (e.g., using TLB shootdowns or the driver will write to registers within the TLB to fill the range engine). Restricting a range entry can include the address range engine no longer mapping an addresses indicated by the invalidation operation but may continue to map not-indicated addresses.

To use ARE without requiring OS changes, various embodiments: piggy-back on the XSAVE/XRSTOR mechanism and handle "TLB invalidation" as also doing range invalidation (disable) and then later re-qualify the mappings and re-enable the range hardware; this makes it possible to use ARE without requiring OS changes, and also can have advantages when ARE is managed directly by an OS.XSAVE/XRESTOR is a family of Intel64 (and x86-64) instructions which allow an OS to perform a process context switch without explicitly saving and restoring each bit of information. For example, AVX-512 adds quite a bit of state, but the OS does not explicitly save/restore AVX state. Instead, it executes XSAVE/XRSTOR, which save and restore all of the AVX state.

An example of a TLB shootdown is as follows. The application, OS, or driver sometimes needs to change mapping information, page permissions (r/w/x) and/or the vaddr-to-paddr mapping. The OS implements this using a multi operation sequence. In a multiprocessor system, one operation is posting a message to each core which asks the core to perform the indicated invalidation and then ACK it to the requestor.

x86 offers several page sizes, and it may be desirable to assign custom regions according to available page sizes. For example, suppose a range engine which can map memory in 2 MiB increments, then allocating 900 MiB of memory takes 450 2 MiB pages but only a single range entry. Given requests for a 1.1 GiB region and a 0.9 GiB region, it may be desirable to use pages for the 1.1 GiB region (1×1 GiB page plus 50×2 MiB pages) and one range mapping for the 0.9 GiB region (instead of 450 page mappings).

An example of TLB invalidation can be as follows. From time to time, the OS needs to update page mappings. Broadly, this means update page table entries. In some cases, this affects memory mapped by the range engine. Page mappings may be cached in TLBs, so a typical approach is to (a) update the page tables to a new value; (b) invalidate some or all TLB contents, often based on address range; and (c) allow TLB misses to read a the new page table entries. Invalidate some or all TLB entries can be performed via a processor instruction such as INVALPG or similar. The process above causes, at any time after the INVALPG runs, the TLB sees only new values. INVALPG can disable any range entries which also map something being invalidated from the TLB. A further complication is the page table entries contain accessed (.A) and dirty (.D) bits. A typical update is the OS will clear these bits, invalidate TLBs, and then on subsequent loads or stores to the pages set the .A bit and stores will also set the .D bit. It is a part of the Intel64 design/specification that these bits are set only in response to actual accesses to the page by some instruction, and are never set speculatively. At the same time, the bits must be set by an instruction—it is an error to perform a load or store and leave .A/.D clear.

If an OS clears .A/.D bits for a page memory which is also mapped by range hardware, then the range hardware and driver must follow the rules. This can be accomplished by (a) invalidating the range entries (as above), (b) let loads/stores proceed using TLB entries—so maybe slower—and (c) and arrange that at some point the driver is invoked. The driver can walk the memory mapped by the range and execute suitable load or store instructions which cause the page table pages to have .A/.D bits set, and then re-enable the range in the range engine. It can then resume the application, and loads and stores can proceed—both (1) mapped via the range engine, and thus avoiding TLB misses, and (2) obeying the .A/.D bit setting rules.

In particular, two address translation engines can be used: a TLB and a range engine. In cases of disagreement with the OS, the OS wins and the TLB can be used for all address translation until it is convenient to run the driver and re-establish agreement with the OS view. This approach makes it possible to manage the range gadget via a driver, while at the same time avoids imposing restrictions on the OS that it must be possible to force a driver to run in a timely manner, e.g., there is no need the driver has to run the first time a location is touched after an INVALPG.

Address range engine 1720 can use a cache or memory to store custom range entries, and is configurable to support any sized regions within a given entry. Using a single custom range entry, address range engine 1720 maps a single range of contiguous virtual memory to contiguous physical memory. In some examples, an address range engine entry 1721 can include a start virtual address and end virtual address which represent the virtual addresses aligned to region size and the entry can include a process ID (or address space identifier) and permission bits.

An overview of a runtime operation that uses address translation from the address range engine and/or TLB is described next. At 1711, UserApp requests access of a page by providing a virtual address (VA). The application during runtime will request a load or store. The load or store will, as part of its execution, perform or request a TLB lookup. At 1712, the VA is provided to Address Range Engine 1720 and TLB 1722 to translate the VA to a physical address (PA) of a page. In connection with a memory transaction from UserApp, address range engine 1720 is accessed in parallel with the TLB 1722 to determine a physical address for a virtual address.

For example, when an application executes an instruction such as ADD R0←[R1], the virtual address is held in processor register R1 and the memory contents for that address are fetched and added to the value in processor register R0. The processor will execute this by forwarding the value from R1 (the virtual address) to the TLB. If the ARE circuit is enabled, the value is also forwarded to the ARE. If either TLB or ARE signals a match, they compute the physical address and forward that to the memory unit. Typically, the memory uses the physical address to look in the processor data cache and retrieve the memory contents (corresponding to the physical address, but since the physical address was derived for the virtual address, it is also corresponding to the virtual address). The memory contents are then sent to the processor's adder which performs the ADD and then forwards the adder result to the register file entry for R0.

In this example, PAs for custom ranges in address range engine 1720 are allocated in big pool 1730. Big pools can be used for large ranges as handling fragmentation with large blocks is easier than mixed with small and large, as the fragmentation gets harder to manage.

The general pool can be flexible, but can be challenging to control it. The big pool has limited flexibility, but can provide more ability to control it. The general pool uses a flexible allocator, but tends to have limited and unpredictable physical contiguity. Thus, when an application does a standard "page" request for a large region, it is often allocated a collection of small regions. For example, a 2 MiB allocation request is often implemented by allocating 512×4 KiB pages because the general pool does not have a contiguous and aligned 2 MiB region. In contrast, the big pool is constructed and used to provide large and contiguous regions. The big pool is initialized with a large contiguous region (for example at system boot, when large contiguous regions are sure to be available). By design, the big pool is not used for general small allocation requests, and so there is little risk of it getting shuffled. When there are big pool allocation request, if there is fragmentation it might be resolved by moving (copying) and remapping several other large regions.

For a write or read transaction, if address range engine 1720 finds a custom range corresponding to the virtual address, address range engine 1720 provides a memory translation to a memory subsystem and the memory subsystem performs the direct storage into big pool 1730 or reads from big pool 1730. If TLB 1722 can provide a PA translation, the PA is used to write or read from memory. The PA in TLB 1722 can be in big pool 1730 or general pool 1732. If the VA is a miss in the address range engine 1720 and TLB 1722, then a page walk can be performed to identify the page table entry (PTE) indicating a physical address corresponding to the virtual address. TLB 1722 can be updated with the missed PTE. In some examples, in general, the driver can update address range engine 1720 or TLB 1722 to provide relevant VA-to-PA translations.

In some examples, if there is a miss in the address range engine 1720, then a translation was not a range and TLB 1722 will handle the page translation. If there is a miss in the TLB 1722, page miss handler (PMH) can be invoked.

In a case involving mapping a range that triggers a miss, the path is to start a normal TLB miss. Ranges are to be in the address range engine 1720 before access to those ranges are requested. If the address range engine 1720 is full, the driver allows the OS to handle the request in the global pool.

TLB 1722 can be a cache of some mappings in the page tables. In some examples, TLB 1722 can be initially empty with respect to a specific UserApp but can be updated if a miss occurs in address range engine 1720. Using PID, address range engine 1720 can differentiate entries for use by multiple threads or UserApps running on a core or processor. In some examples, address space randomization can be used such that different instances of the same application access different physical addresses.

In some examples, regions covered by address range engine 1720 and TLB 1722 do not have overlapping address ranges.

At 1713, the Address Range Engine 1720 finds an entry that corresponds to the VA and provides the PA to a memory controller to access content stored starting at the PA in the physical memory. A custom range entry 1721 can include one or more of: a VA starting address of a range, VA ending address of a range, process identifier (or address space identifier (ASID)), or permission. A custom range entry 1721 can correspond to a virtual address if the virtual address is between high and low virtual addresses of entry 1721 (e.g., within VADDR start address and VADDR end address), then physical address conversion can be performed by address range engine 1720. Permission can refer to whether an application can access a page or whether the page is read only or can be written to.

Permission can refer to another item is accessed/not-accessed clean/dirty. A page may be writable but has not been written since some earlier event; or may be accessible (read, write, instruction fetch) but has not been used since some earlier event. In common use, the page table entries have one-bit fields "A" and "D." An OS will mark memory regions as A=0, D=0 in the page tables and perform a TLB invalidation. When the processor touches the memory the first time after the TLB invalidation, it sets the PTE's "A" bits for the corresponding memory; and when it writes the memory the first time, it sets "D" bits.

Page tables define permissions and TLB entries (cached PTEs) have the same information. Some of permissions are R=read permission, W=write permission, X=execute permission, and U/S=user/supervisor permission. The first three are commonly described as RWX or (say) R-X for read/execute but writes are prohibited. U/S typically means either S=supervisor-only access, only the OS kernel can access the page; or U=both the user/application code and the supervisor can access it.

In the event of a hit, address range engine 1720 or TLB 1722 provides physical address to a memory controller (not shown) to access memory. In some examples, a translation of the VA to physical address can use a mask. A physical address can correspond to page range or custom address range. An example VA to PA conversion is as follows.

1. Configure a new memory range
   1. The virtual address range is from low=FFDD,BB12, 0000,0000 to high=FFDD,BB1A,FFFF,FFFF.
   2. The SRE has some smallest step in size, in this example 64 KiB, which is 1,0000,0000 hex.
   3. Thus, VLO represents only the upper bits of the low virtual address; the lower 16 bits are implicitly all-zero.
   4. Similarly, VHI represents only the upper bits of the virtual address, the upper bits are implicitly all-one.
   5. The region is mapped to support loads and stores but is not mapped for instruction execution. This is represented as "RW-".
   6. Address translation proceeds as-if VLO . . . VHI was part of a larger $2^N$-aligned and $2^N$-sized physical page. This "larger page" is of size/alignment that entirely contains VLO . . . VHI. N may be selected as the bit position where all higher bits of vaddrs low and high are the same. In this example, FFDDBB1 is the common part, so bits 19 and below differ, 20 and up are the same.
   7. SPLIT is set accordingly to 20.
   8. The physical memory being mapped starting at VLO is paddr=0123,4512.
   9. This value is rounded down according to SPLIT, in this example so bits 19 and below are all-zero, so PA=0123,4510.
2. Access memory
   1. There is a store to vaddr=FFDD,BB15,5555,5555
   2. The SRE compares vaddr to the [0] and [1] entries and the load/store type (here, a store) to the permissions.
   3. vaddr is outside of the range described by [1] and so is ignored.
   4. vaddr is inside the range described by [0] and so is considered for address translation.
   5. A store is compatible with RW-, so is considered for address translation.

6. Virtual address translation proceeds as paddr=PA|vaddr [63:SPLIT].
7. In this example, paddr=0123,4510|5,5555,5555=0123,4515,5555,5555

Figure 18:
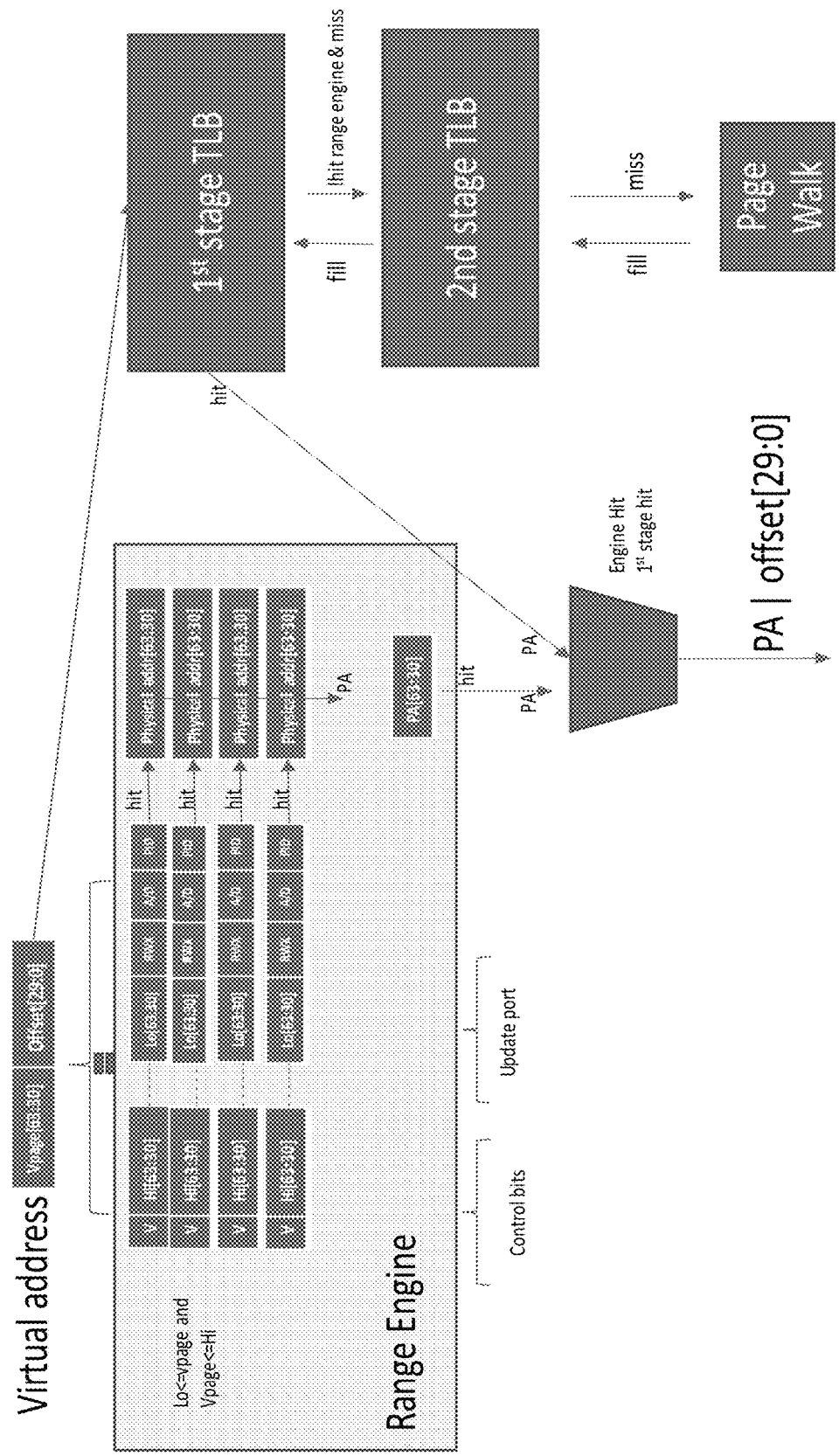
FIG. 18 shows an address range engine performing a translation of a virtual address range.

FIG. 18 shows address range engine performing a translation of a virtual address range. Address range engine accesses entries. An entry has a tag, virtual address range (starting and ending), process identifier (PID) (or address space identifier), and permission. The address range engine compares the current virtual address bits with starting and ending virtual addresses. The address range engine can check ranges of multiple entries in parallel if it is a fully or set associative. After obtaining a range the current virtual address belongs to, the address range adds the offset and protection bits to perform the translation.

In some examples, both the ARE and TLB provide PAs. The lines labeled "PA" also include a "valid" indicator. If only one is valid, then content of the valid line is selected. If both lines are valid, then either may be selected. "Both valid" is sometimes called "multi-hit". In a multi-hit condition, an indicator can be provided to the TLB which indicates multi-hit. The TLB can invalidate the corresponding TLB entry but the mapping can be retained in the ARE, and the invalidated TLB entry is available to fill with other page table mappings.

In some examples, entries have the same hardware structure but on an address probe only a subset are consulted. If the probe matches, then processing is as above. If the probe does not match, then the remaining entries are consulted in order to perform a full hit/miss determination. This can be useful when an application has phased behavior whereby if some entries are valid but are not being used by the current phase, then it can save power to consult only the active ranges. If an inactive range is used on "remaining entries are consulted", then the inactive entry may be marked active so that on following probes it will be included in the set that are probed first.

In some examples, some entries may be implemented using a faster but more expensive (area/power) design, while other entries are implemented using a cheaper design. For example, one might have a one-cycle match/mismatch determination while the other has a two-cycle match/mismatch determination. For some uses, this can give a good average/ overall effective performance while reducing the implementation cost and/or supporting a larger number of range entries without increased cost.

Figure 19:
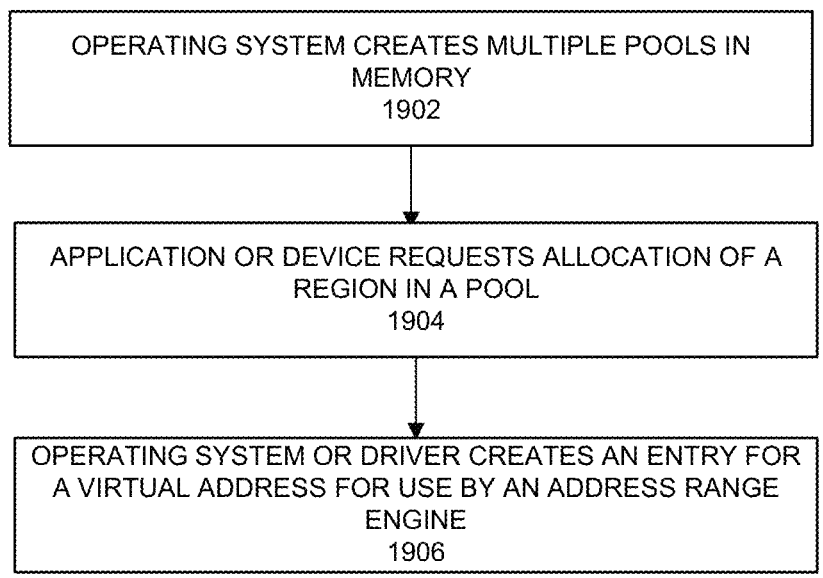
FIG. 19 depicts a process that can be performed to initialize use of an address range engine in connection with a memory address translation.

FIG. 19 depicts a process that can be performed to initialize use of an address range engine in connection with a memory address translation. At 1902, an OS creates multiple pools in memory. For example, the multiple pools can include a big pool page and general page. At 1904, an application or device can request memory allocation of a specified custom range in a pool. For example, the request can be for a custom range in a big pool. At 1904, the OS or driver allocates a region in the big pool corresponding to the specified custom range of the memory allocation request. At 1906, the OS or driver maps a virtual address corresponding to a beginning of the requested memory allocation to an address range engine and creates a custom range entry for use by the address range engine. A custom range entry can include one or more of: a VA starting address of a range, VA ending address of a range, process identifier, or permission. The custom range entry can specify any length region in the big pool or memory for which the address range engine can provide a physical address translation. The address range engine can use the custom range entry to identify a virtual address has a corresponding physical address allocated in the big pool.

The process "application requests . . . creates an entry" (1904, 1906) can be repeated without needing to repeat "creates multiple pools" (1902). In some scenarios, the process could request more memory from another pool (though this may not always succeed), and/or could return "excess" big-pool memory to another pool. In the event that the process' pools are exhausted or insufficient to meet the allocation request, the process might return an error indicator and/or fall back on the general page allocator (albeit at reduced mapping efficiency). In the event that the ARE entries for a process are all in-use, the process can map a subset of requests using ARE entries and then request the OS to map the remaining requests using ordinary pages.

Figure 20:
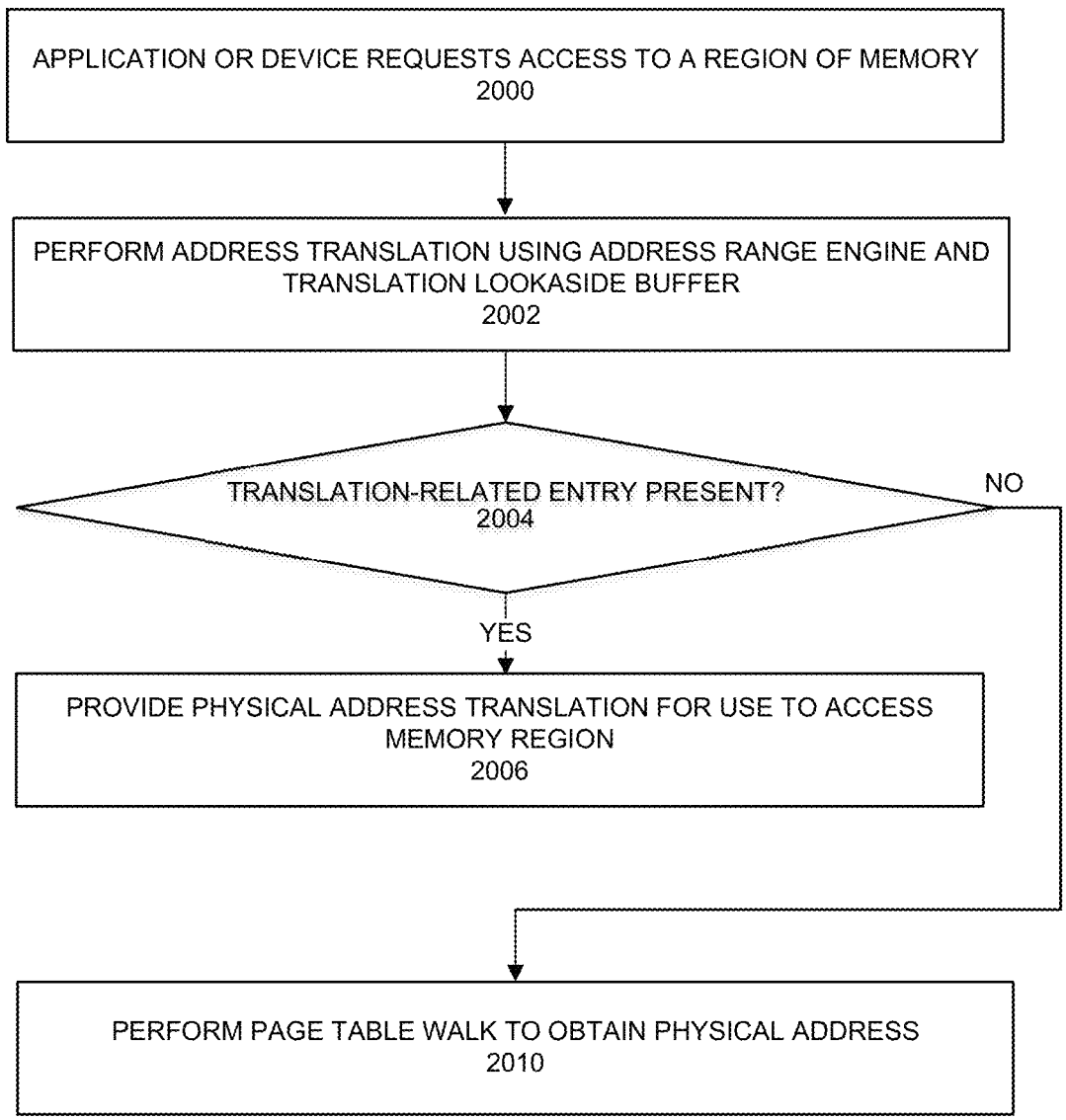
FIG. 20 depicts a process that can be used to perform a virtual to physical address translation.

FIG. 20 depicts a process that can be used to perform a virtual to physical address translation. At 2000, an application or device can request access to region of memory. The application or device can provide a virtual address to identify a region of memory to access. At 2002, address translation can occur using an address range engine and translation lookaside buffer in parallel. The address range engine can determine if a custom entry is available to use to identify a physical address translation for the virtual address. The translation lookaside buffer can determine if a page table entry is available to use to identify a physical address translation for the virtual address. At 2004, a determination is made if an address translation is available using either the custom entry or page table entry. If an address translation is available using either the custom entry or page table entry, the process continues to 2006. If an address translation is not available using either the custom entry or page table entry, the process continues to 2010, where a page table walk is performed to identify a page table entry indicating a physical address corresponding to the virtual address.

At 2006, a physical address translation is provided. When a custom entry is available from the address range engine for virtual address translation, the physical address can be determined using a translation process described with respect to FIG. 18. When a page table entry is used for virtual address translation, the physical address in the page table entry is provided to a memory controller to perform a memory access for the requester application or device.

In some examples, only one of the ARE or TLB may be consulted initially, perhaps based on a predictor or other information which favors using one unit over the other. This can reduce power use since only one mapping engine is consulted and/or increased parallelism. For example, one request is presented to the ARE at the same time some second request is presented to the TLB, rather than delaying until the ARE finishes the first request and only then presenting the second request to both ARE and TLB.

In some examples, 2002 and 2004 are pairs of parallel processes and 2010 is performed when both 2002 and 2004 report that no entry is present.

Figure 21:
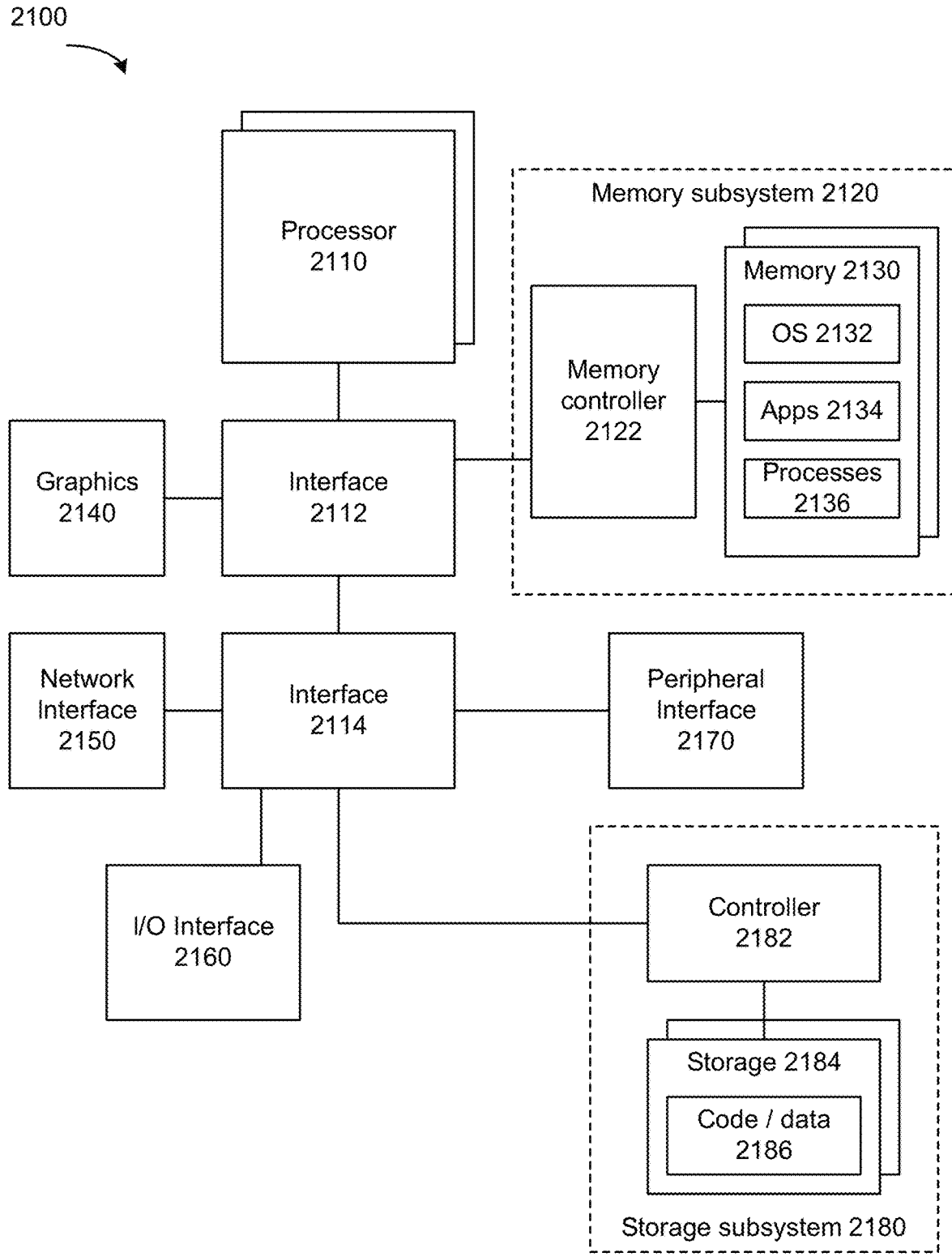
FIG. 21 depicts a system.

FIG. 21 depicts a system. The system can use embodiments described herein at least to use technologies described herein to allocate custom sized ranges in a pool in memory. System 2100 includes processor 2110, which provides processing, operation management, and execution of instructions for system 2100. Processor 2110 can include any type of microprocessor, central processing unit (CPU), graphics processing unit (GPU), processing core, or other processing hardware to provide processing for system 2100, or a combination of processors. Processor 2110 controls the overall operation of system 2100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2100 includes interface 2112 coupled to processor 2110, which can represent a higher speed interface or a high throughput interface for system components that needs higher bandwidth connections, such as memory subsystem 2120 or graphics interface components 2140, or accelerators 2142. Interface 2112 represents an interface circuit, which can be a standalone component or integrated onto a processor die. Where present, graphics interface 2140 interfaces to graphics components for providing a visual display to a user of system 2100. In one example, graphics interface 2140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2140 generates a display based on data stored in memory 2130 or based on operations executed by processor 2110 or both. In one example, graphics interface 2140 generates a display based on data stored in memory 2130 or based on operations executed by processor 2110 or both.

Accelerators 2142 can be a programmable or fixed function offload engine that can be accessed or used by a processor 2110. Accelerators 2142 can be coupled to processor 2110 using a memory interface (e.g., DDR4 and DDR5) or using any networking or connection standard described herein. For example, an accelerator among accelerators 2142 can provide compression (DC) capability, cryptography services such as public key encryption (PKE), cipher, hash/authentication capabilities, decryption, or other capabilities or services. In some embodiments, in addition or alternatively, an accelerator among accelerators 2142 provides field select controller capabilities as described herein. In some cases, accelerators 2142 can be integrated into a CPU socket (e.g., a connector to a motherboard or circuit board that includes a CPU and provides an electrical interface with the CPU). For example, accelerators 2142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 2142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2120 represents the main memory of system 2100 and provides storage for code to be executed by processor 2110, or data values to be used in executing a routine. Memory subsystem 2120 can include one or more memory devices 2130 such as read-only memory (ROM), flash memory, one or more varieties of random access memory (RAM) such as DRAM, or other memory devices, or a combination of such devices. Memory 2130 stores and hosts, among other things, operating system (OS) 2132 to provide a software platform for execution of instructions in system 2100. Additionally, applications 2134 can execute on the software platform of OS 2132 from memory 2130. Applications 2134 and OS 2132 can be executed within a virtual machine environment or container environment with distinct allocated memory regions. Applications 2134 represent programs that have their own operational logic to perform execution of one or more functions. Processes 2136 represent agents or routines that provide auxiliary functions to OS 2132 or one or more applications 2134 or a combination. OS 2132, applications 2134, and processes 2136 provide software logic to provide functions for system 2100. In one example, memory subsystem 2120 includes memory controller 2122, which is a memory controller to generate and issue commands to memory 2130. It will be understood that memory controller 2122 could be a physical part of processor 2110 or a physical part of interface 2112. For example, memory controller 2122 can be an integrated memory controller, integrated onto a circuit with processor 2110.

While not specifically illustrated, it will be understood that system 2100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2100 includes interface 2114, which can be coupled to interface 2112. In one example, interface 2114 represents an interface circuit, which can include standalone components and integrated circuitry. In one example, multiple user interface components or peripheral components, or both, couple to interface 2114. Network interface 2150 provides system 2100 the ability to communicate with remote devices (e.g., servers or other computing devices) over one or more networks. Network interface 2150 can include an Ethernet adapter, wireless interconnection components, cellular network interconnection components, USB (universal serial bus), or other wired or wireless standards-based or proprietary interfaces. Network interface 2150 can transmit data to a device that is in the same data center or rack or a remote device, which can include sending data stored in memory. Network interface 2150 can receive data from a remote device, which can include storing received data into memory. Various embodiments can be used in connection with network interface 2150, processor 2110, and memory subsystem 2120.

Network interface 2150 can provide high speed communications can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

In one example, system 2100 includes one or more input/output (I/O) interface(s) 2160. I/O interface 2160 can include one or more interface components through which a user interacts with system 2100 (e.g., audio, alphanumeric, tactile/touch, or other interfacing). Peripheral interface 2170 can include any hardware interface not specifically mentioned above. Peripherals refer generally to devices that connect dependently to system 2100. A dependent connection is one where system 2100 provides the software platform or hardware platform or both on which operation executes, and with which a user interacts.

In one example, system 2100 includes storage subsystem 2180 to store data in a nonvolatile manner. In one example, in certain system implementations, at least certain components of storage 2180 can overlap with components of memory subsystem 2120. Storage subsystem 2180 includes storage device(s) 2184, which can be or include any conventional medium for storing large amounts of data in a nonvolatile manner, such as one or more magnetic, solid state, or optical based disks, or a combination. Storage 2184 holds code or instructions and data 2186 in a persistent state (e.g., the value is retained despite interruption of power to system 2100). Storage 2184 can be generically considered to be a "memory," although memory 2130 is typically the executing or operating memory to provide instructions to processor 2110. Whereas storage 2184 is nonvolatile, memory 2130 can include volatile memory (e.g., the value or state of the data is indeterminate if power is interrupted to system 2100). In one example, storage subsystem 2180 includes controller 2182 to interface with storage 2184. In one example controller 2182 is a physical part of interface 2114 or processor 2110 or can include circuits or logic in both processor 2110 and interface 2114.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2100. More specifically, power source typically interfaces to one or multiple power supplies in system 2100 to provide power to the components of system 2100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2100 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various embodiments can be used in data centers to scale-out storage or memory transactions involving memory pools, storage pools, or accelerators and using NVMe-oF. Various embodiments can be used by cloud service providers that use distributed resources (e.g., compute, memory, storage, accelerators, storage). Distributed resources can be located among one or more of: a base station, fog data center, edge data center, or remote data center. Various embodiments can be used in a base station that supports communications using wired or wireless protocols (e.g., 3GPP Long Term Evolution (LTE) (4G) or 3GPP 5G), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

What is claimed is:

1. A method comprising:
    allocating one or more pools in one or more memory devices;
    receiving a request to allocate a specified custom range in a pool of the one or more pools;
    allocating the custom range in the pool;
    generating a custom range entry, using a driver, for use to provide a physical address translation for a subsequent request related to the custom range;
    receiving a memory transaction with an associated virtual address;
    determining a physical address translation of the virtual address based on the custom range entry and a page table entry of a translation lookaside buffer (TLB); and
    issuing a memory access request associated with the determined physical address to a memory device of the one or more memory devices.

2. The method of claim 1, wherein the allocating one or more pools in one or more memory devices comprises allocating a big pool region and general region.

3. The method of claim 1, wherein the custom range comprises a memory range different than a memory range associated with the page table entry used by the translation lookaside buffer and wherein the custom range is specified by an application.

4. The method of claim 1, further comprising: based on a context switch, saving the custom range entry for subsequent access.

5. The method of claim 1, wherein the custom range entry comprises: a starting virtual address, an ending virtual address, an address space identifier, and a permission field.

6. The method of claim 1, wherein the allocating one or more pools in one or more memory devices comprises allocating a big pool region and general region and comprising associating the custom range with the big pool region.

7. The method of claim 1, wherein the generating the custom range entry for use to provide the physical address translation for the subsequent request related to the custom range comprises associating the custom range entry with an address range engine for use in parallel with the translation lookaside buffer to determine a virtual-to-physical address translation.

8. The method of claim 1, wherein the custom range entry comprises a starting virtual address and an ending virtual address and wherein the determining the physical address translation of the virtual address based on the custom range entry comprises:
    based on the virtual address being between the starting virtual address and the ending virtual address of the custom range entry, generating a physical address translation by transforming the virtual address.

9. The method of claim 1, comprising:
    an operating system or driver performing:
        invalidating a page table entry in the TLB and invalidating or restricting the custom range entry;
        based on no valid entry in an address range circuit, utilizing the TLB for address translation; and
        after validation of a second custom range entry, enabling use of the validated second custom range entry.

10. The method of claim 1, wherein the custom range comprises a memory range that is larger than a memory range associated with the page table entry.

11. The method of claim 1, wherein address range translations of the custom range and the page table entry of the TLB do not overlap.

12. The method of claim 1, wherein the determining the physical address translation of the virtual address based on the custom range entry and the page table entry of the TLB comprises determining the physical address translation of the virtual address based on the custom range entry in parallel with determining the physical address translation of the virtual address based on the page table entry of the TLB.

13. A non-transitory computer-readable medium comprising instructions stored thereon, that if executed by at least one processor, cause the at least one processor to:
    allocate one or more pools in one or more memory devices;
    receive a request to allocate a specified custom range in a pool of the one or more pools;
    execute a driver to allocate the custom range in the pool;
    request formation of a custom range entry for use to provide a physical address translation for a subsequent request related to the custom range;
    receive a memory transaction with an associated virtual address;
    determine a physical address translation of the virtual address based on the custom range entry and a page table entry of a translation lookaside buffer (TLB); and
    issue a memory access request associated with the determined physical address to a memory device of the one or more memory devices.

14. The computer-readable medium of claim 13, wherein the custom range entry comprises custom sized region in a memory of the one or more memory devices.

15. The computer-readable medium of claim 13, wherein the custom range comprises a memory range that is larger than a memory range associated with the page table entry used by the TLB.

* * * * *